United States Patent
Palella et al.

(10) Patent No.: US 10,761,218 B2
(45) Date of Patent: Sep. 1, 2020

(54) SYSTEM FOR LAND VEHICLE NAVIGATION AND CORRESPONDING METHOD

(71) Applicant: STMicroelectronics S.r.l., Agrate Brianza (MB) (IT)

(72) Inventors: Nicola Matteo Palella, Rivolta d'adda (IT); Leonardo Colombo, Lecco (IT)

(73) Assignee: STMICROELECTRONICS S.R.L., Agrate Brianza (MB) (IT)

( * ) Notice: Subject to any disclaimer, the term of this patent is extended or adjusted under 35 U.S.C. 154(b) by 0 days.

(21) Appl. No.: 16/043,402

(22) Filed: Jul. 24, 2018

(65) Prior Publication Data
US 2019/0033466 A1    Jan. 31, 2019

(30) Foreign Application Priority Data
Jul. 31, 2017 (IT) .................. 102017000087876

(51) Int. Cl.
| G01S 19/47 | (2010.01) |
| G07C 5/00 | (2006.01) |
| G01P 15/18 | (2013.01) |
| G01S 19/40 | (2010.01) |
| G01C 22/00 | (2006.01) |
| G01C 21/16 | (2006.01) |

(52) U.S. Cl.
CPC ............ *G01S 19/47* (2013.01); *G01C 21/165* (2013.01); *G01C 22/00* (2013.01); *G01P 15/18* (2013.01); *G01S 19/40* (2013.01); *G07C 5/008* (2013.01)

(58) Field of Classification Search
None
See application file for complete search history.

(56) References Cited

U.S. PATENT DOCUMENTS

| 6,360,165 | B1 | 3/2002 | Chowdhary | |
| 6,466,887 | B1* | 10/2002 | Weinbrenner | G01C 21/26 701/1 |
| 7,714,745 | B2 | 5/2010 | Fang | |
| 2002/0008661 | A1* | 1/2002 | McCall | G01C 21/165 342/357.3 |
| 2011/0066397 | A1 | 3/2011 | Kranz | |

(Continued)

FOREIGN PATENT DOCUMENTS

WO    2017111620 A1    6/2017

OTHER PUBLICATIONS

Collin, J., "MEMS IMU Carouseling for Ground Vehicles", IEEE Transactions on Vehicular Technology, vol. 64, No. 6, Jun. 2015, 10 pages.

(Continued)

*Primary Examiner* — Tamara L Weber
(74) *Attorney, Agent, or Firm* — Slater Matsil, LLP

(57) ABSTRACT

In an embodiment, a system for land vehicle navigation includes: a GNSS receiver providing GNSS data, a set of sensors positioned on a wheel of a vehicle and on board the vehicle; and a processing unit. An on-wheel unit is located on the wheel of the vehicle, the on-wheel unit including a first subset of sensors. An on-board unit includes a second subset of sensors configured to generate a second sensor data. The processing unit is configured to process the first and second sensor data to obtain the distance and the attitude of vehicle and to perform a fusion with the GNSS data.

21 Claims, 9 Drawing Sheets

(56) References Cited

U.S. PATENT DOCUMENTS

| | | | | |
|---|---|---|---|---|
| 2012/0022780 A1* | 1/2012 | Kulik | .................... | G01C 21/28 |
| | | | | 701/498 |
| 2013/0325334 A1* | 12/2013 | Mian | ...................... | G01C 21/00 |
| | | | | 701/518 |
| 2015/0142311 A1* | 5/2015 | Sun | ...................... | G01C 21/165 |
| | | | | 701/472 |
| 2016/0154112 A1* | 6/2016 | Nichols | ................... | G01S 19/10 |
| | | | | 342/357.47 |
| 2016/0334804 A1 | 11/2016 | Webber et al. | | |
| 2017/0276801 A1* | 9/2017 | Schilling | ................. | G01S 19/49 |

OTHER PUBLICATIONS

Wang, Yu-Jen, et al., "Wideband Electromagnetic Energy Harvesting from a Rotating Wheel", National Formosa University, National Cheng Kung University, Industrial Technology Institute, Taiwan, Oct. 31, 2012, 23 pages.

* cited by examiner

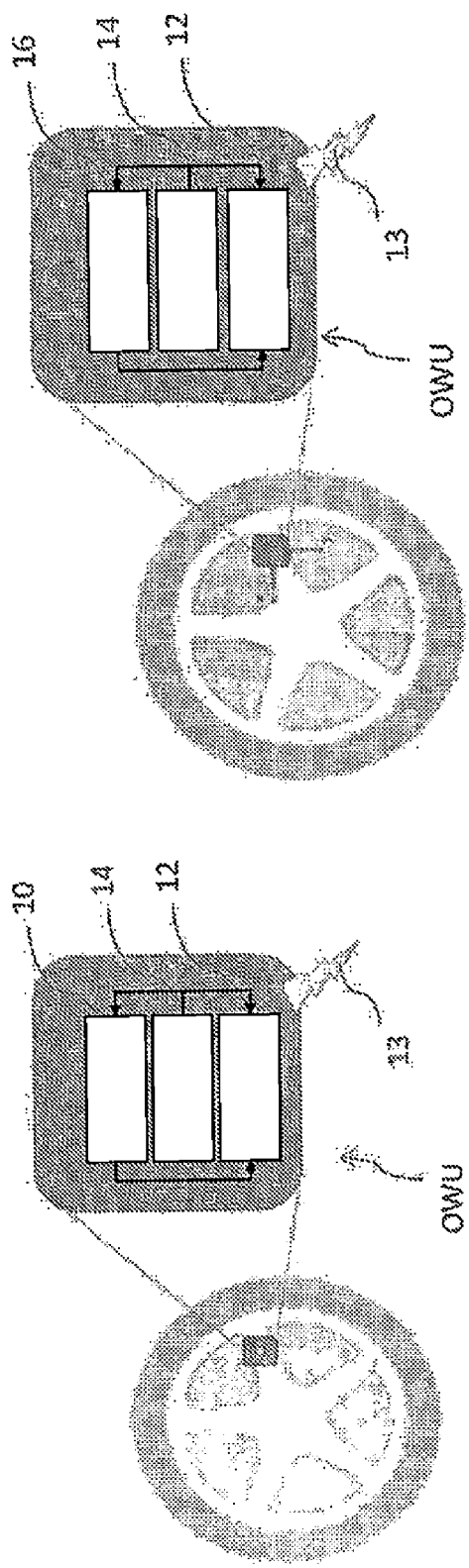
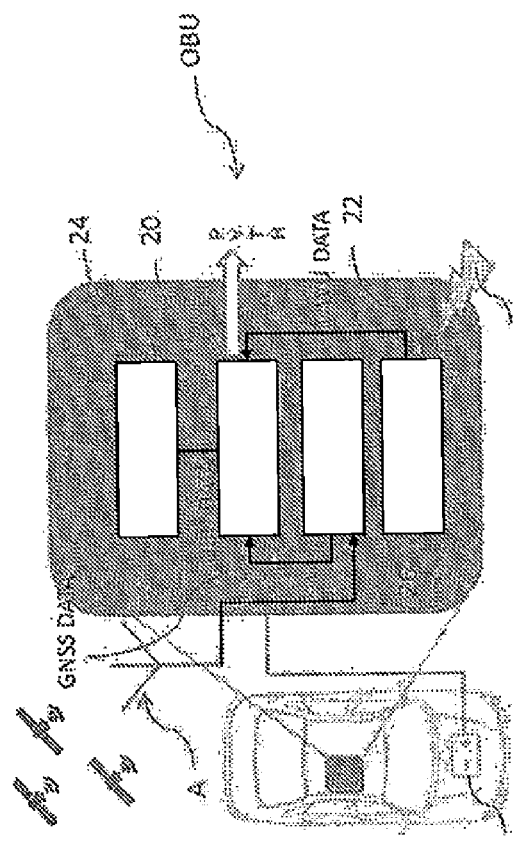

SYSTEM FOR LAND VEHICLE NAVIGATION AND CORRESPONDING METHOD

CROSS-REFERENCE TO RELATED APPLICATIONS

This application claims priority to Italian Patent Application No. 102017000087876, filed on Jul. 31, 2017, which application is hereby incorporated herein by reference.

TECHNICAL FIELD

The present invention relates generally to an electronic system and method, and, in particular embodiments, to a system for land vehicle navigation and corresponding method.

BACKGROUND

A currently leading technology for positioning applications in the automotive market is Global Navigation Satellite System (GNSS), with conventionally used navigation systems including navigation and telematics. In the near future, emerging applications such as autonomous driving, car to car (and to infrastructure) communication may provide for further technological challenges.

A GNSS receiver provides an absolute position reference, while possibly exhibiting one or more drawbacks. For example, a GNSS receiver relies on a satellite signal, which may be unavailable (e.g., indoor, tunnels) or corrupted (e.g., urban environments, reflections, and/or multipath).

In order to overcome these limitations, a solution may involve merging GNSS technology with other navigation technologies, to facilitate generating a redundant system wherein a component is able to overcome the disadvantages of one or other type of components.

Examples of technologies complementary to GNSS include inertial sensors, e.g., Inertial Measurement Units, (3-axes) gyroscopes, (3-axes) accelerometers, odometers, compasses, and/or barometers.

An aim of such merged or coupled systems, is therefore to exploit the features of each navigation technology in order to facilitate providing accurate information, possibly switching seamlessly to inputs from the GNSS system or the inertial system. The science studying methods to merge GNSS and other sensors, exploiting their complementary features, is called sensor fusion. In the automotive field, for example, sensor fusion frameworks may include Dead Reckoning (DR), where a GNSS system is complemented with a gyroscope (e.g., for yaw rate detection), an odometer or a velocity sensor (e.g., for a travelled path). Also, with the addition of a 3-axes accelerometer to the sensors, DR systems may become tri-dimensional (3D), i.e., a sensor-based height calculation may be possible.

Integrating a 3-axes accelerometer may lead to the development of another fusion technology: Inertial Navigation System (INS), based on calculation of travelled distance directly from an accelerometer, through a double-integration of measured accelerations. Although the processing framework therein appears to be complex, their functionality may be summarized stating that they calculate travelled distance from accelerometer by double integrating its signal. Such systems may provide position with increased availability and accuracy in respect of standalone GNSS receivers, and without vehicle connection (e.g., an odometer is virtually replaced by the accelerometer). Since odometer/velocity sensors are superfluous, the unit may be disconnected from the vehicle or may not receive any data from it, making it more suitable for e.g., aftermarket projects or situations where the final user or installer may find it difficult to retrieve a vehicle connection (which may be a confidential information exclusive of the vehicle producers).

Nevertheless, the accuracy level is inferior to connected DR systems due to the complex accelerometer signal integration. For example, the accelerometer does not only assess vehicle accelerations, but also gravitational acceleration, which means that potentially if one was able to completely separate the two accelerations, one would obtain an accurate travelled distance estimation.

However, such separation is not possible in practical application, and, although mitigated, a fraction of gravitational acceleration may occur in an integrated accelerometer signal, yielding to a velocity and position error increasing with time. Additionally, the Bill Of Materials (BOM) for such systems is higher than in the previous cases, e.g., the cost of combined GNSS, gyroscope and accelerometer.

A conventional positioning system may include one or more of the components described in the following. The positioning system may include a GNSS receiver block, implemented either in hardware or software, which may be used for receiving satellite signals from one or more Global Navigation Satellite Systems (GNSS), for calculating absolute user position, velocity, heading, travelled distance and time, and for transmitting raw GNSS measurements (pseudo-ranges and frequency of tracked SV—Satellite Vehicles) and/or Position Velocity and Time (PVT).

Also, an Internal Measurement Unit (IMU) may be provided, including e.g., a 3-axes gyroscope and/or a 3-axes accelerometer, which may be composed by two separate sensors (3+3-axes) or by a single package containing both sensors (6 axes). The block may be implemented in hardware and it may include a 3-axes gyroscope, used to assess angular rates, and a 3-axes accelerometer, used to assess accelerations (the axes of each sensor being perpendicular to one another, i.e., oriented like a classic xyz reference frame). Independently of its arrangement, an output of the IMU block may be generated, at each epoch, by the motion of a vehicle on which it is mounted, e.g., using three angular rates and three accelerations.

These measures are referred to as "raw" sensor data, which may imply that: the data are not calibrated for known error sources (conventionally, sensitivity and bias); and/or the data are related to a reference frame centered and fixed in the sensor itself, conventionally referred to as sensor (or body) frame.

With respect to angular rates and accelerations physically acting on the vehicle, the angular rates and accelerations which may be relevant to a navigation application are related to a frame centered and fixed to the vehicle; the frame being conventionally referred to as vehicle (or navigation) frame.

As previously mentioned, GNSS and IMU systems may be integrated in the same device, insofar as the benefit of one compensates the drawbacks of the other: in fact, GNSS is a technology with an accuracy possibly influenced by environmental aspects (e.g., reflected signal), hence being highly space correlated and poorly time correlated. In other words, GNSS may be inaccurate in a short term scenario (or at high frequencies), but it may be accurate in a long term scenario (or at low frequencies).

On the other hand, IMU and in general motion sensors show inherent errors, independent from the surrounding scenario (e.g., inaccuracy in calibration), causing an error that integrates over time; they are accurate short term (at high frequencies) and may diverge in a long term scenario (at low frequencies).

Another component that may be included in a DR system (e.g., connected to a vehicle) is the vehicle interface processor, introduced to manage a connection with, while possibly decoding, vehicle data.

The outputs of IMU and GNSS components flow into a main processor block, which implements, either in hardware or in software, an operation which is referred to as sensor fusion, i.e., merging the contribution of each block in order to overcome the limitations of each technology and generating a (possibly seamless) integration of the two, with the aim of providing as an output continuous and accurate position, velocity/speed and attitude. The quantities (i.e., position, velocity and attitude) may then be transferred from the main processor block to its final application.

For example, in case of a navigation system, the final application may include a mapping unit aimed to match a calculated position on a map, and use it to guide a user toward a selected destination. In a telematics system, a PVT output may be sent via a wireless link (e.g., 2G, 3G, Wi-Fi, BT) to a service provider, such as an insurance company which aims to monitor the travelled distance or the driving style or a transportation company which aims to track its fleet, or other internet of things (IoT) style examples.

As previously mentioned, the most popular way to provide a standalone positioning capability is a GNSS receiver, namely a unit/box capable of receiving (via an antenna) GNSS signals and of using them to calculate a user position, velocity and time. However, GNSS receivers are accurate only as long as the signal conditions are good.

Moreover, the cost of the GNSS receiver may vary depending on features (i.e., precise positioning/RTK—Real Time Kinematic—raise the cost). However the BOM of a standalone solution may be conventionally lower than a BOM for a solution integrated with other technologies. On the other hand, such standalone units may exhibit the drawback of being highly inaccurate in reflective or obstructed environments (e.g., urban scenarios) and their service may be unavailable indoor (e.g., in tunnel or parking areas) where GNSS signals are difficult to receive.

As previously mentioned, to overcome standalone GNSS limitations, position units including DR technology were introduced, including components as set forth previously. The unit augments performance through the integration of angular sensors (e.g., gyroscope, differential velocities) and distance sensors (e.g., odometer, tachymeter). This makes it possible to provide an accurate position independently from GNSS availability, because, in the (at least partial) absence of satellite signals, such units continue, possibly seamlessly, to provide position calculating the relative motion using as a starting point a last valid GNSS calculated point, with distance and angular sensors providing linear and angular motion, respectively.

In this case, the positioning quality depends on the quality of the sensors, insofar as the accuracy of a relative motion depends solely on type and calibration thereof, i.e., on sensor grade: military-grade IMUs (i.e., embedding gyroscopes and accelerometers) may show virtually no error, while mid/low cost sensors conventionally used in commercial applications exhibit a progressive error accumulation when GNSS is unavailable.

Another drawback of DR includes the use of a wired connection to a vehicle to calculate a travelled distance, conventionally assessed through sensors of wheel motion (e.g., a magnetic encoder). In particular, there are two conventional techniques that may be used to transfer data across a vehicle:

Analog or Discrete Odometer: an analog signal transmits raw pulses generated by the wheel encoder sensor, i.e., velocity is directly proportional to pulses rate of the sensors; and/or a standard cable which may be connected to an electronic device through a standard General Purpose I/O (GPIO), e.g., it may be loaded on a vehicle information system such as the Controller Area Network (CAN) bus. In this case, the information is pre-processed and encoded in a binary format, proprietary of the car maker (the velocity, on a CAN bus, may be already pre-calculated).

Concerning the automotive field, such a limitation may be detrimental for after-market and commercial applications (e.g., telematics insurance boxes, vehicle tracking systems), where the positioning unit is sold separately from the vehicle itself and may be installed on the vehicle either by a third party or the user itself. Under these premises, it may be difficult to connect the unit to the travelled path source of the vehicle. For example, in case of an analog odometer, the point that may be used to connect with a cable may be unknown, or it may change for different manufacturers and/or vehicles.

Also, connecting to the cable may involve unmounting a part of the vehicle dash, an operation that is hardly suited to an end user and may require the involvement of a professional with a specific background. This is not only costly, but it may also be detrimental for a consumer aftermarket application (e.g., if buying a device implies tweaking a car, then an end user might not want to buy it).

Also, in case of CAN bus, even if the CAN bus is accessed, the information is possibly encrypted; a decoding key is a proprietary information of a car manufacturer, that may be conservative and not willing to disclose it, in order not to provide an advantage to competition. Information may be shared, e.g., with key industrial partners which may imply an original equipment manufacturer (OEM) business model. In conclusion, for an aftermarket or consumer application, it may be difficult to obtain access to vehicle data.

In addition to this, the BOM for such systems appears to be higher than for GNSS systems, as the IMU poses an additional cost.

SUMMARY

One or more embodiments relate to the capability of a device to determine a user position, velocity and altitude (i.e., 3D direction).

One or more embodiments may rely on inertial navigation, which aims to merge a contribution of absolute positioning sources (e.g., GNSS, Wi-Fi, or other ranging techniques) with sources providing relative movement (e.g., distance, rotation and acceleration sensors).

One or more embodiments may relate to inertial navigation systems in automotive applications, of four or more wheeled vehicles. Such embodiments may include DR systems.

In an example embodiment, a system for land vehicle navigation includes a GNSS receiver providing GNSS data, a set of sensors positioned on a wheel of a vehicle and on board the vehicle; and a processing unit. An on-wheel unit is located on the wheel of the vehicle, the on-wheel unit including a first subset of sensors. An on-board unit includes a second subset of sensors configured to generate a second sensor data. The processing unit is configured to process the first and second sensor data to obtain the distance and the attitude of vehicle and to perform a fusion with the GNSS data.

One or more embodiments may include a corresponding method.

BRIEF DESCRIPTION OF THE DRAWINGS

One or more embodiments will now be described, by way of example only, with reference to the annexed figures, wherein:

FIGS. 1 and 2 are exemplary of possible implementations of an on-wheel unit, according to one or more embodiments, FIG. 3 is exemplary of a possible implementation of an on-board unit, according to one or more embodiments.

DETAILED DESCRIPTION OF ILLUSTRATIVE EMBODIMENTS

Figure 4:
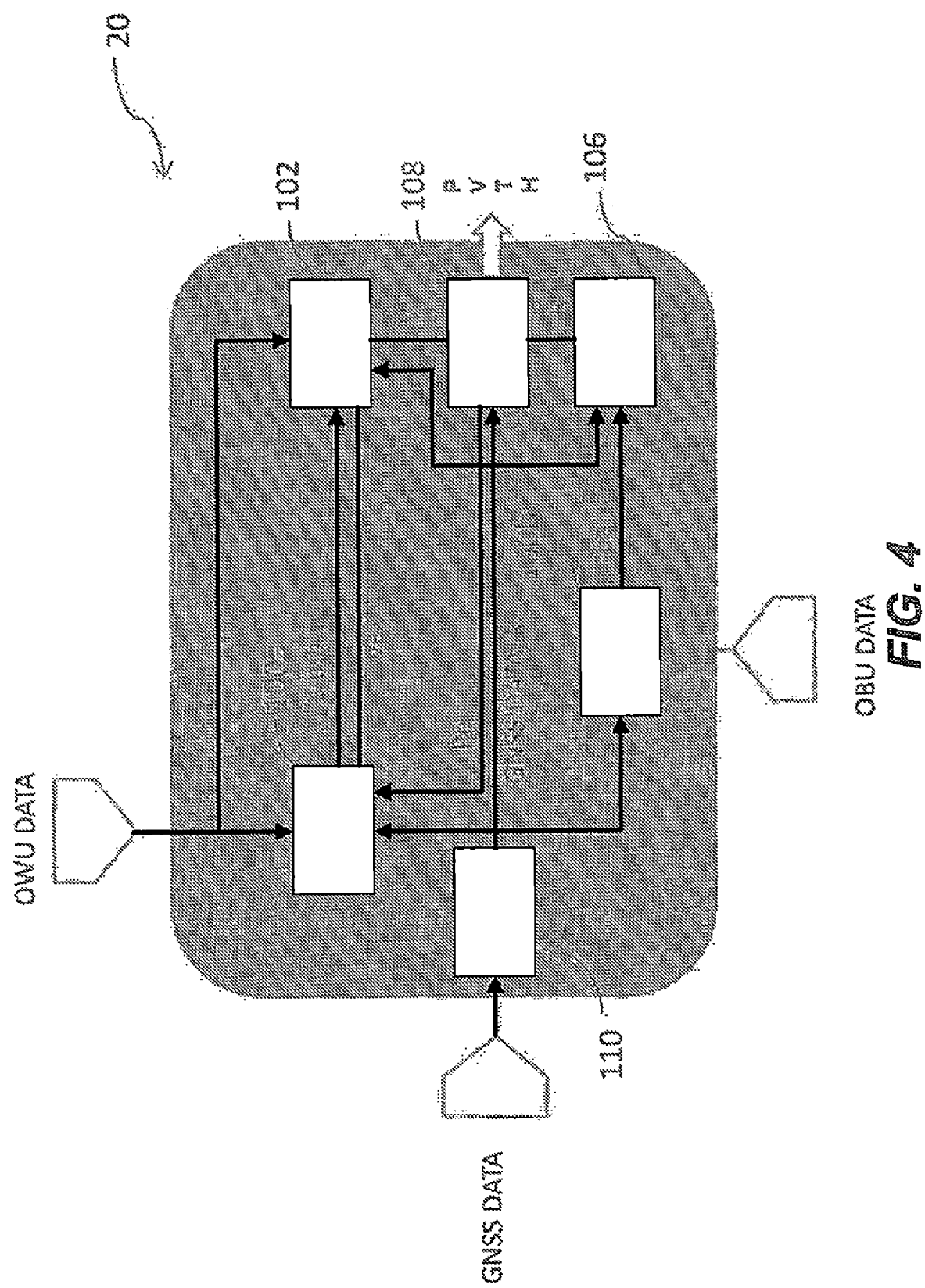
FIGS. 4 and 5 are exemplary of possible implementations of a processor, according to one or more embodiments.

In the ensuing description, one or more specific details are illustrated, aimed at providing an in-depth understanding of examples of embodiments of this description. The embodiments may be obtained without one or more of the specific details, or with other methods, components, materials, etc. In other cases, known structures, materials, or operations are not illustrated or described in detail so that certain aspects of embodiments will not be obscured.

Reference to "an embodiment" or "one embodiment" in the framework of the present description is intended to indicate that a particular configuration, structure, or characteristic described in relation to the embodiment is comprised in at least one embodiment. Hence, phrases such as "in an embodiment" or "in one embodiment" that may be present in one or more points of the present description do not necessarily refer to one and the same embodiment. Moreover, particular conformations, structures, or characteristics may be combined in any adequate way in one or more embodiments.

The references used herein are provided merely for convenience and hence do not define the extent of protection or the scope of the embodiments.

One or more embodiments may be based on DR navigation techniques, which provide application with (possibly real-time) position, velocity and time (PVT) of a user inside a vehicle.

In one or more embodiments, such output (PVT) may be computed via a fusion of GNSS and inertial motion sensors.

According to one or more embodiments, the system described, which is here indicated also as Wireless Dead Reckoning (WDR) system may include two modules:

an on-wheel unit, referred to in the description and figures as OWU, placed on a wheel of the vehicle and configured for, e.g., distance measurement; and/or an on-board unit, referred to in the description and figures as OBU, configured for, e.g., GNSS reception, inertial heading measurement and implementing a fusion for merging the available data to obtain a PVT solution.

The OWU and OBU, in order to cooperate for navigation applications, may be connected preferably through wireless communication modules, which are configured to generate a wireless link to exchange data. Such modules may include one or more transceivers, and/or a transmitter/receiver, and/or either a transmitter or a receiver, based on the designed task thereof.

In one or more embodiments, the communication protocol may be implemented in different ways, for example, to facilitate obtaining a mounting ease and user friendliness. For example, a wireless communication protocol may include, e.g., Bluetooth (BT), if a system where the two units, OWU and OBU, are placed at a relatively short distance is considered. In one or more embodiments, the units may therefore be interconnected while being isolated and independent from, e.g., an external infrastructure or other vehicles. However, in one or more embodiments, it may be possible to use a different communication protocol, e.g., Wi-Fi or other short range technologies.

Although, as just mentioned, in a preferred embodiment the wireless communication modules are isolated and independent, in particular with respect to an external network or communications infrastructures of other vehicles, wireless communication modules, in particular such as Wi-Fi modules, may make it possible to obtain a communication between the OBU and OWU units, which may in case become a part of a network and, e.g., possibly connect to an external processing infrastructure and/or to units mounted on other vehicles.

This architecture may be used in certain applications: e.g., Vehicle to Infrastructure (V2X) employs an OBU unit based on 5-9 GHz Dedicated Short Range wireless Communication (DSRC), which includes a two-way, short-range wireless communications technology.

Figure 13:
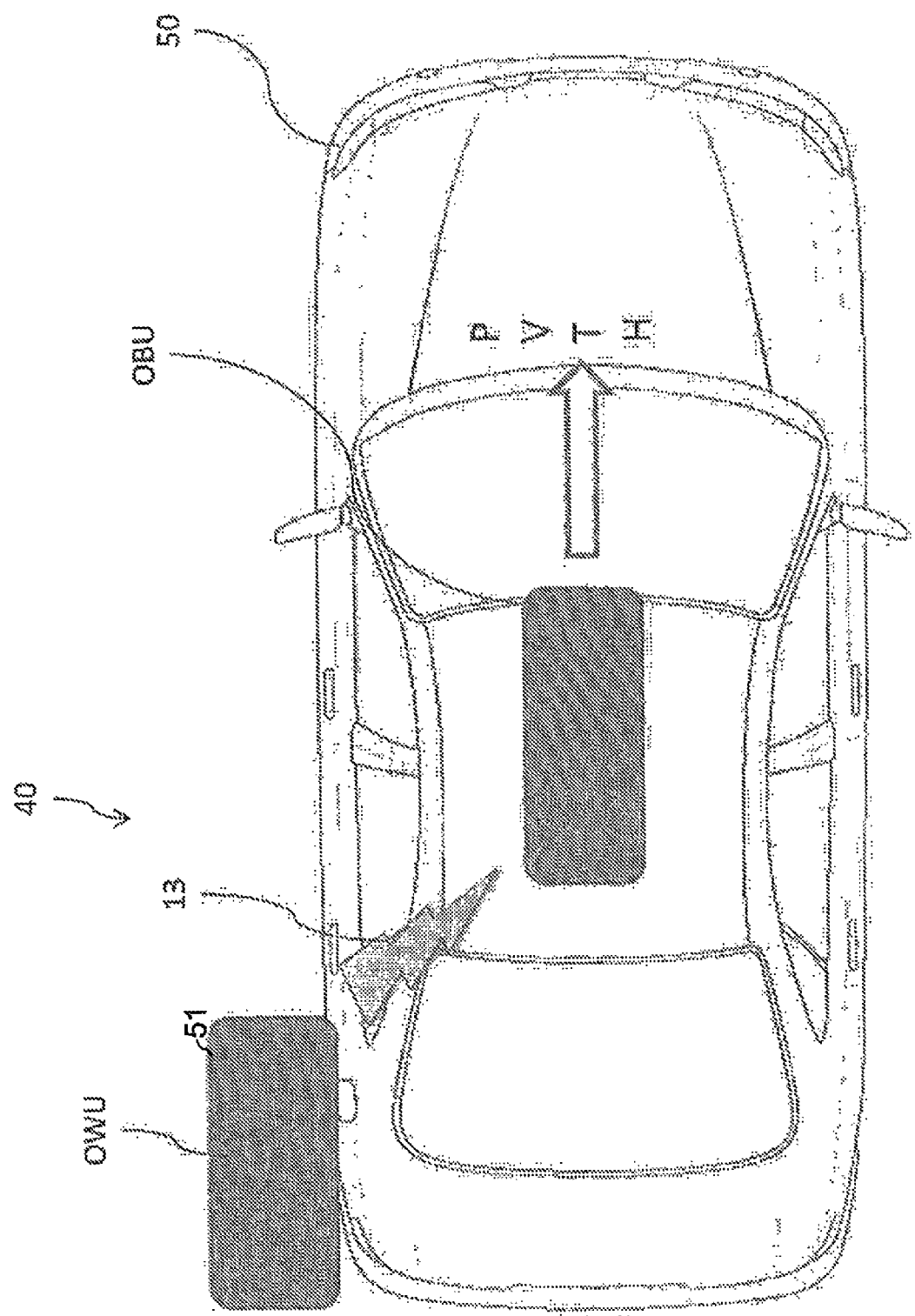
FIG. 13 is exemplary of a possible implementation of a system for land vehicle navigation, according to one or more embodiments.

In FIG. 13 is schematically represented the system for land vehicle navigation, comprising a dead reckoning navigation system, here described, indicated as a whole by the numerical reference 40, which includes an on-wheel unit OWU, including at least one sensor, located on a wheel 51 of a vehicle 50. The on-wheel unit OWU is configured to obtain, in particular through such sensor, data that can be processed to obtain the distance travelled by the vehicle, in particular an angular rate of the wheel. The system 40 includes then an on-board unit OBU, located on board the vehicle 50, including, as better detailed in the following, at least a GNSS receiver and one or more inertial sensors providing data that can be processed to obtain the altitude of vehicle. The on wheel unit OWU and the on board unit OBU include respective wireless communication modules configured to establish a wireless link 13 to exchange over the link the data that can be processed to obtain the distance from the on wheel OWU to the on board unit OBU. The on-board unit OBU is configured to operate in association with a processor, preferably located within the on-board unit OBU, configured to process the data to obtain the distance and the attitude of vehicle and to perform a fusion with data measured by the GNSS receiver, such as GNSS position P", heading H", velocity V" and time T".

FIGS. 1 and 2 are exemplary of an on-wheel unit OWU according to one or more embodiments, that is, the unit assessing travelled distance. In one or more embodiments, the on-wheel unit OWU may be implemented as a small, portable device which may include one or more of the following components.

In one or more embodiments as exemplified in FIG. 1, the on-wheel unit OWU may include a gyroscope 10, which may be a 1, 2 or 3-axes gyroscope. The gyroscope 10 may be used to assess the angular rate of the rotating wheel and transmit the data to a wireless communication module, in this embodiment exemplified as a transmitter 12. The communication among the gyroscope 10 and the transmitter 12 may be in turn implemented via a serial cabled technique, e.g., Inter-Integrated Circuit (I2C) or Serial Peripheral Interface (SPI).

In one or more embodiments, the on-wheel unit OWU may include the wireless transmitter (and, in various embodiments, possibly also receiver) 12, which may implement the transmitter side of a wireless short range connection protocol, over a wireless link 13, of e.g., the kind mentioned in previous section (e.g., BT or Wi-Fi). The wireless transmitter 12 may be configured to receive angular rate data from the gyroscope 10 (e.g., via cabled techniques) and transmit the data via the wireless link, 13 to a wireless communication module, exemplified in FIG. 3 as a receiver 22, on the on-board unit OBU, which is represented in some detail in FIG. 3, in order to facilitate minimizing jitter and latency amongst the on-wheel unit OWU and the on-board unit OBU. In other words, the performance in a WDR application context may benefit from a preferably real-time transmission process.

In one or more embodiments, the OWU wireless transmitter 12 may be implemented in order to operate also as a receiver (not illustrated), i.e., in one or more embodiments the wireless communication module 12 may include an OWU wireless transmitter/receiver 12. The OWU wireless transmitter/receiver may perform normal operation (i.e., data transfer), while also receiving control commands (i.e., on/off, diagnosis, etc.) by a central control unit, e.g., a processor 20.

In one or more embodiment, the on-wheel Unit OWU may be electrically supplied by lithium batteries, however such a solution may lead to one or more drawbacks, that may prove to be non-negligible: e.g., the batteries may need to be recharged or substituted after a time, but the on-wheel unit OWU may be configured for a use in an automotive system which leaves an end user (almost) unaware of its presence; or, e.g., the batteries have a limited durability, relatively large size and weight, and may lead to environmental pollution upon disposal.

As a result, in one or more embodiments, the on-wheel unit OWU may include an energy harvester 14, a device which may convert tire rotation or mechanical road vibration energy into electricity, thus providing a power supply to the units (e.g., ICs—Integrated Circuits) on the on-wheel unit OWU, and optionally storing energy in an embedded battery (not illustrated).

The energy harvester 14 may implement an upper peak power point tracking function and integrate switching elements of a buck boost converter, in order to allow charging of the battery, if present, by monitoring an end-of-charge and lower peak battery voltage to avoid over discharge and to preserve battery life.

In one or more embodiments, the power manager may be adapted to be suitable for kinetic harvesting sources, under a plurality of temperature and irradiance conditions.

In one or more embodiments, for on-wheel applications, a wide bandwidth or a frequency-adjusting energy harvesting device may be provided, insofar as it may be used to cope with a possibly high frequency of wheel rotation in e.g., land vehicles. A method to implement an energy harvester, along with references, is proposed by Intec, at the URL http://www.intechopen.com/books/small-scale-energy-harvesting/wideband-electromagnetic-energy-harvesting-from-a-rotating-wheel. It was observed that the system may be able to provide, depending on vehicle velocity, up to e.g., 660 micro-Watt of power.

In one or more embodiments, the on-wheel unit OWU may be used during vehicle operation, assessing wheel rotation rate and transmitting the rate to the on-board unit OBU, e.g., wirelessly over the wireless link 13). Also, in one or more embodiments, the on-wheel unit OWU may be autonomously power supplied by the vehicle motion itself.

In one or more embodiments, as depicted in FIG. 2, the on-wheel unit OWU may comprise the energy harvester 14 (e.g., of the kind described previously), the wireless communication module e.g., the transmitter 12 (e.g., of the kind described previously) and an accelerometer 16, being e.g., at least a 2-axes accelerometer.

The accelerometer 16 may be used to assess the components of gravity acceleration in two perpendicular directions, i.e., x and y axes in FIG. 2.

The obtained data may be then processed and it may be indicative of an angular rate of the rotating wheel. In one or more embodiments, the on-wheel unit OWU may be appointed to obtain (raw) data from the accelerometer 16 and transmit it to the wireless transmitter 12. The communication among the units 12 and 16 may be implemented with a standard serial cabled technique, e.g., I2C or SPI.

In one or more embodiments, therefore, the conversion from (raw) accelerations to the wheel rotation rate may be performed by the processor 20 on the on-board unit OBU of FIG. 3.

In one of more embodiments, the on-wheel unit OWU may, e.g., during vehicle operation, assess the gravity components on the accelerometer axes (x, y) and transmitting them to the on-board unit OBU, e.g., optionally wirelessly (again, in FIGS. 1 to 3, the wireless link is exemplified by reference number 13). Again, it may be autonomously power supplied insofar as it may be supplied by vehicle motion itself.

In a system according to one or more embodiments, the on-board unit OBU, depicted in FIG. 3, may be implemented as a companion unit to the on-wheel unit OWU. The on-board unit OBU may be used to receive sensor data from the on-wheel unit OWU, process and fuse the received data with data from GNSS observables and OBU sensors, in order to calculate PVT (Position-Velocity-Time), possibly independently from the GNSS signal condition.

In one or more embodiments, the on-board unit OBU may be installed so that it is strap-down, i.e., tightened to a vehicle body, to facilitate obtaining virtually no movement of the unit.

In one or more embodiments, the on-board unit OBU may comprise one or more of the following components.

With reference in particular to FIG. 3, the on-board unit OBU may include the OBU wireless receiver 22, already mentioned, i.e., a wireless communication module implementing the transmitter and/or receiver of a, e.g., dual way wireless short range connection protocol, of the kind mentioned previously (the wireless link being exemplified by reference number 13). The OBU wireless receiver 22 may receive OWU DATA, angular rate and/or acceleration components, from the on-wheel unit OWU and transmit it to the processor 20 (of the kind mentioned previously) e.g., via a wired digital communication. Generally, OWU DATA may be representative of a vehicle's travelled distance.

The processor 20 may then convert the data, e.g., from inertial measurements into travelled distance.

In one or more embodiments, the on-board unit OBU may comprise a gyroscope 24. Thanks to its position on the body of the, e.g., land vehicle, the gyroscope 24 may be able to measure the angular motion of the car with a certain degree of sensitivity.

In one or more embodiments, the gyroscope 24 may detect (if properly calibrated) a variation in vehicle direction in a NE—North East plane, i.e., in heading. The gyroscope 24 may provide an accurate vehicle delta heading measurement, i.e., a difference in heading over time; the data, OBU DATA, being transmitted to the processor 20.

In different embodiments, the gyroscope 24 may be a 1, 2 or 3-axes gyroscope.

In case of a 1-axis gyroscope, the installation location may be preferably "flat", i.e., with the sensing axis perpendicular to the vehicle travelling direction. In case of a 2-axes gyroscope, the system may be able to cope with an installation wherein 1 angle, out of 2 angles describing misalignment against the horizontal plane, may be different from 0. In case of a 3-axes gyroscope, the system may cope with a random on-board unit OBU installation, where two (out of two) horizontal misalignment angles may be non-zero (i.e., pitch and roll).

The gyroscope 24 may therefore transmit sensor data, OBU DATA, preferably real-time, to the processor 20, via a, e.g., standard digital serial communication protocol, as it may be observed in FIG. 3.

Also, in one or more embodiments, the on-board unit OBU may comprise a further wireless communication module, exemplified in FIG. 3 with a GNSS receiver 26, i.e., an integrated circuit that may be used to receive (e.g., from a dedicated antenna A) and decode GNSS signals and that may be able to calculate, when GNSS signals make it possible, the absolute position, velocity and time of the vehicle.

The GNSS receiver unit 26 may transmit (preferably real time) GNSS DATA, e.g., observables and/or PVT output, to the processor 20, via e.g., a standard digital serial communication protocol or a wireless link, in case a transmitter/receiver 26 is used and/or the processor 20 may be located outside of the on-board unit OBU.

In one or more embodiments, the on-board unit OBU may comprise a processor 20, which may fuse absolute and relative received data, as previously stated.

In one or more embodiments, the processor 20 may calibrate the OWU and OBU sensors and provide position, velocity and attitude, possibly independently from GNSS signal quality.

The data, gathered by the different units described previously, i.e., OBU DATA, OWU DATA and GNSS DATA, may flow into the processor 20, that may process the data and may be configured to calculate a desired PVTH (position-velocity-time-heading).

In one or more embodiments, all the devices and units which may be present on the on-board unit OBU may be power supplied by the vehicle, e.g., by a battery B of the vehicle.

It will be noticed that, in one or more embodiments, the processor 20 may be implemented separately from the on-board unit OBU, as an external standalone unit (arrangement which is not illustrated in the drawings). In a context of, e.g., telematics/GIS (geographic information system) applications/internet of things, the processor 20 may be also implemented as a remote entity, receiving the data flows from, e.g., different vehicles, performing remotely the calculations and yielding the output. The remote processor 20 may then transmit back to the vehicle(s) for its use or collect it in a "big data" collection, used by a, e.g., geographic information service for other purposes, such as a fleet management and/or traffic monitoring.

In various embodiments, the processor 20 may therefore receive as an input one or more of the following signals:

OWU DATA, accelerometer 16 acceleration(s) and/or gyroscope 10 angular rate(s); and/or GNSS DATA, observables and/or PVT output from the GNSS receiver 26; and/or OBU DATA, on-board gyroscope 24 angular rate(s).

In one or more embodiments, the processor 20 may provide as output a position, either expressed in Earth-Cantered Earth-Fixed (ECEF) or geodetic format, velocity, in terms of speed or heading, and possibly accurate time PVTH.

Figure 5:
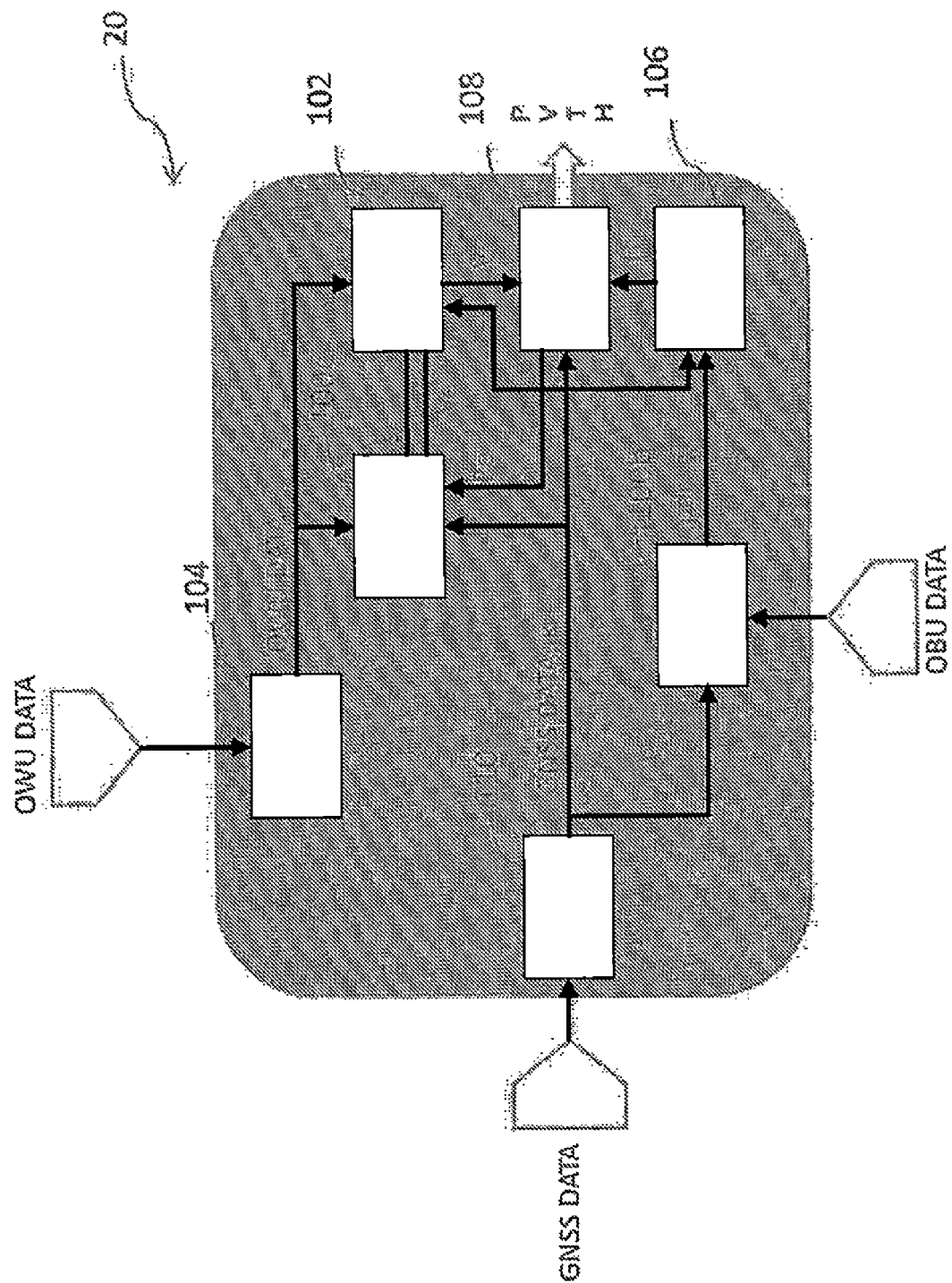

As exemplified in FIG. 4 or 5, the processor 20 may be divided in various underlying processing blocks, representative of the steps to be performed to calculate the PVTH output from the input data.

The embodiment shown in FIG. 5 differs with respect to the embodiment of the processor 20 shown in FIG. 4 in that the (raw) OWU DATA, i.e., x and y axis signals from the accelerometer 16 of the on-wheel unit OWU, are processed, i.e., converted into a wheel rate signal (processed) OWU DATA, by a wheel rate calculation block 104. While in FIG. 4 the data OWU DATA are sent to a calibrating block bow, in the embodiment of FIG. 5 the wheel rate signal OWU DATA' are sent to a calibrating block 100*c*.

The processor 20 thus may include a calibration block 100*a* (100*c* in FIG. 5) receiving the OWU DATA and a calibration block 100*b* receiving the OBU DATA from the inertial sensors, the calibration processes performed in such block retaining a common base but being possibly different from each other depending on the sensor.

In particular, in one or more embodiments, the calibration blocks 100*a* and 100*c* may provide as an output calibration parameters.

In the embodiments shown, the GNSS DATA are sent first to an evaluation block 110 configured to evaluate the GNSS signal quality in order to avoid correcting the parameters if the GNSS signal is corrupted.

The embodiments shown consider only either a sensor 10 or a sensor 16, for the sake of simplicity and understanding. However, embodiments implementing a fusion of the sensors 10 and 16 may be considered, with related consequences on implementation of processor 20 which are well within the capabilities of the person skilled in the art.

In one or more embodiments, the calibration operation may be modelled by preferably three parameters, per axis, being referred to as bias (b), sensitivity/scale (s) and bias variation over temperature (b). The equations of the calculation process are described as follows, with $g_i$ representing raw gyroscope measurements, with i=1,2,3 representing x, y and z axis respectively, while $g'_i$ represents the calibrated measurement, the index t=1,2, . . . , ∞ being used to identify discrete time instants, and T representing a sensor temperature:

$$g'_i = s_i(g_i - b_i) \quad (1)$$

$$s_{i,t} = s_{i,t-1} \quad (2)$$

$$b_{i,t} = b_{i,t-1} + \dot{b}_{i,t}(T_t - T_{t-1}) \quad (3)$$

$$\dot{b}_{i,t} = \dot{b}_{i,t-1} \quad (4)$$

In case of the implementation with the accelerometer 16, the equations are alike, with a term $\alpha_i$, acceleration measurement, used instead of $g_i$.

In one or more embodiments, calibration may be aided by a reference, i.e., a GNSS signal, if the signal is of sufficient quality.

In one or more embodiments, the sensors may be used to calculate a replica-version of the GNSS output(s) and/or observables, i.e., Position-Velocity-Time-Heading. The replica-version may be compared to the value obtained with the GNSS reference and, if the two calculated values may be considered substantially the same, the model (and parameters) may be considered correct. In case of a discrepancy, the parameters may be corrected using error(s) calculated through the discrepancy between the two values, and the corrected parameters may be transmitted to one or more of the blocks in the system.

The calibration block complexity may depend on the type of sensors used. For example, considering IMU MEMS of consumer/non-safety automotive type as in the case of the model described above, it may be possible to assume that the bias b varies depending on time and environmental conditions, in particular with respect to temperature. Such assumptions hold e.g., if low-cost MEMS sensors are used. If the grade of employed IMU increases, the stability of such parameters may be increased (and dependency from environment reduced), so that in one or more embodiments, one or more parameters may be considered constant and they may not need runtime estimation. This way, a device manufacturer may be able to obtain parameter values from a datasheet, and may set the parameters via a configuration or hard code them into the solution.

Also, in the model described above, the variation of the bias with respect to temperature b and the sensitivity s may be substantially constant in a specific sensor. However, they may change from one sensor to the other, and monitoring these parameters may retain one or more advantages:

a calibration by the device manufacturer at the end of the production line, which may be costly and time consuming, is superfluous, and/or long term variations of the component calibration may be determined, e.g., due to aging.

Thus, summarizing, the calibration blocks 100a/100c output calibration parameter s, b, $\dot{b}$, which are supplied to the blocks computing the observables. In one or more embodiments as exemplified in FIG. 4 or 5, the calculated parameters s and/or b may be fed to one or more blocks of the processor 20. In particular, in the embodiments depicted in FIGS. 4 and 5, a velocity calculation block 102 may be included, receiving as an input OWU DATA (in the processor 20 described in FIG. 5 the calculation block 102 may receive processed input OWU DATA, OWU DATA', insofar as the raw signal may not be per se indicative of a vehicle wheel rate as described in the following) and the calibration parameters s, b, $\dot{b}$ from block bow, or already calibrated sensor data (not illustrated), for converting such OWU data into a system output, i.e., velocity V', e.g., so that the data may be compared with the GNSS reference. In case the OWU DATA include data from the OWU gyroscope 10 of FIG. 1, processing the data may be represented by the following equations:

$$v = \omega R = g'_i R \quad (5)$$

$$v = R s_i(g_i - b_i) \quad (6)$$

where v is the calculated vehicle velocity (also referred to as V'), ω is the angular rate and R is a wheel radius.

It was observed that the wheel size value R may be critical for the operations of the system here described: e.g., the conventional wheel size stated in vehicle or tire specifications may prove unsatisfactory insofar as a tire inflation status may change the radius value R in a way which may be considered non-negligible in certain situations, e.g., for equation 3 effectiveness.

As a consequence, in one or more embodiments it may be possible to assume $S_i = R s_i$, so that $$v = S_i(g_i - b_i) \quad (7)$$

The value of the radius R may thus be embedded into the on-wheel unit gyroscope 10 calibration model, and it may also be calibrated accordingly, by comparing the output with GNSS velocity V" or travelled path.

In one or more embodiments as depicted in FIG. 5, the OWU DATA may include (raw) data from the accelerometer 16 of FIG. 2, and the velocity calculation block 102 may receive calibration parameters s and a processed OWU DATA from the accelerometer 16.

As mentioned, in one or more embodiments, as depicted in FIG. 5, the (raw) OWU DATA, i.e., x and y axis signals from the accelerometer 16 of the on-wheel unit OWU, may be processed, i.e., converted into a wheel rate signal OWU DATA' by a wheel rate calculation block 104, the operations thereof being described as follows.

Considering the x and y component signals of the accelerometer 16 and considering an instant in time, the axes may sense components of the gravity vector being 90 degrees apart in phase. Considering now a time varying system with wheel rotation, the two components may oscillate producing a signal which may be comparable to an IQ (In-phase/Quadrature) modulated signal.

It was thus observed that extracting the frequency may imply obtaining the phase variation over time, which in e.g., a vehicle may substantially translate into the wheel rotation rate.

In one or more embodiments, the wheel rate calculation block 104 may therefore be intended as an FM (Frequency Modulation) demodulator for a complex IQ signal.

However, the block 104 may return a processed rate (i.e., expressed in revolutions/second), OWU DATA', which may be incompatible with travelled path computation. Hence, in one or more embodiments, OWU DATA' may be calibrated by identifying the distance travelled at each revolution, i.e., using the tire circumference. This may be done, in one or more embodiments, via the on-wheel unit accelerometer calibration block 100c, configured to identify the scale factor s to be applied to the wheel rate signal in a substantially similar way with respect to calibration block bow of the gyroscope 10, i.e., comparing the signal to a GNSS-derived travelled distance, calculated from GNSS DATA received as an input to the calibration block 100c.

It will be noticed that the wheel rate at zero velocity in this scale is zero by definition and estimating a bias b is thus superfluous. This may result in a lower number of parameters to be calculated.

In one or more embodiments, the on-board unit OBU may comprise a block configured to convert OBU sensor data into observables, namely a heading calculation block 106, visible in FIGS. 4 and 5. The block 106 may be configured to process the on-board gyroscope 24 signals, OBU DATA, by performing an integration. For example, if the gyroscope 24 is a 1-axis gyroscope, $h_i$ being the heading at instant i:

$$h_i = h_{t-1} + g'_t dt \quad (8)$$

It will be also noted that equation (8) may require an initial value for the calculation of the heading, which may be difficult to obtain from the gyroscope 24 which may be configured only to assess the rate.

In one or more embodiments, the reference heading may be obtained by GNSS, if the signal condition permits it. The reference heading may allow the person skilled in the art to implement an estimation model capable of correcting the heading and/or the variables that are needed to calculate such heading (e.g., the calibration parameters).

In one or more embodiments, a step of comparing the heading output of the previous models with the heading provided by a different source (e.g., GNSS) may be provided, which may allow to identify an error, possibly associated with calibration parameters, which may be used recursively on the calibration parameters to correct them.

This process, repeated in time, may allow finding a steady value for the calibration parameters and it may lead the system to a steady state, possibly accurate operating condition.

The processor 20 described in FIGS. 4 and 5 then may include a navigation engine block 108, which may receive as an input the (corrected, resulting from a comparison of the calculated sensor-based values V'/H' and GNSS values V'''/H'') velocity V and heading H, and GNSS reference data (i.e., absolute velocity V''', position P''' and heading H''') and GNSS quality metrics, such as quality indicator k (which will be described later in more detail, and aid the processor 20 in weighting the GNSS signal, i.e., the metrics are representative of the GNSS signal quality), and provide as an output the correct position-velocity-time-heading PVTH.

The navigation engine block 108 may be configured to exploit calculated heading H and velocity V in order to obtain a recursive, possibly real-time, update of a user position, expressed in terms of, e.g., latitude and longitude, respectively:

$$\lambda_t = \lambda_{t-1} + \cos(h_t) v_t dt \quad (9)$$

$$\phi_t = \phi_{t-1} + \sin(h_t) v_t dt \quad (10)$$

In one or more embodiments, the position obtained via equations 9 and 10 is relative, i.e., an initialization point may be required, e.g., provided by GNSS or another absolute positioning source.

During operation, a difference between a relative and absolute positioning source may be considered as an error, resulting from an error in one or more of the calibration parameters.

Preferably, a position error Pe, issued by block 108, may be used as a feedback for the calibration blocks 100a, 100b, 100c and/or the navigation engine block 108, in order to improve or correct the current estimate.

One or more embodiments of the processor 20 may also include suitable evaluation through a GNSS quality evaluation block 110, configured to evaluate the GNSS signal quality in order to avoid correcting the parameters with corrupted data. The GNSS quality evaluation block 110 may receive as an input GNSS DATA, and provide as an output GNSS DATA plus a GNSS quality indicator k, that may be representative of the quality of the signal.

In one or more embodiments, quality evaluation may comprise one or more of:

a GNSS acceptance block, implementing one or more logical conditions that may be fulfilled in order to consider the signal valid (e.g., it may be possible to use the GNSS signal as reference in the calculation of the error); if the conditions are not met, the current GNSS signal(s) may be discarded; and/or a GNSS weighting block, configured to implement soft decisions based on substantially the same rationale and/or quality parameters that may be used for the acceptance block.

For example, GNSS information may be entirely considered reliable if the signal power, e.g., cno, is over 45 dB/Hz, while it may be considered as unusable if its power is below 20 dB/Hz.

Therefore, a possible implementation of the acceptance and weighting block may include:

refusing GNSS signal, i.e., having quality indicator k=0, when cno<20 dB/Hz (example of hard decision);

if accepted, if 20 dB/Hz<cno<45 dB/Hz, giving to the GNSS quality indicator k a weight between 0 and 1; and if accepted and if cno>45 dB/Hz, giving weight 1 (i.e., full acceptance) to quality indicator k (example of soft decision).

The same technique may be possible for a number of different parameters being representative of GNSS quality, and should not be considered limited to its signal power.

For example, considering the quality indicator k derived from GNSS quality metrics (e.g., the signal power, as previously exemplified), modulating the influence of GNSS data on current estimations, the acceptance block may express a value, e.g., 0 or 1, refusing or accepting the input, respectively; the weighting block may express a statistical based decision, with k being possibly able to take any value between 0 and 1, depending on the quality of the GNSS signal, which in turn may depend on operating conditions.

Equations 11 and 12 exemplify a possible use of the quality indicator k in one or more embodiments, with latitude and longitude:

$$\lambda_t = \lambda_{rel} + k_t(\lambda_{ref} - \lambda_{abs}) \quad (11)$$

$$\phi_t = \phi_{rel} + k_t(\phi_{ref} - \phi_{abs}) \quad (12)$$

with t, rel and abs subscripts indicating the time instant and a relative and absolute value, respectively.

Thus, in general with reference to the FIGS. 1 to 5, the system 40 operates in one possible embodiment operates as follows.

Figure 6:
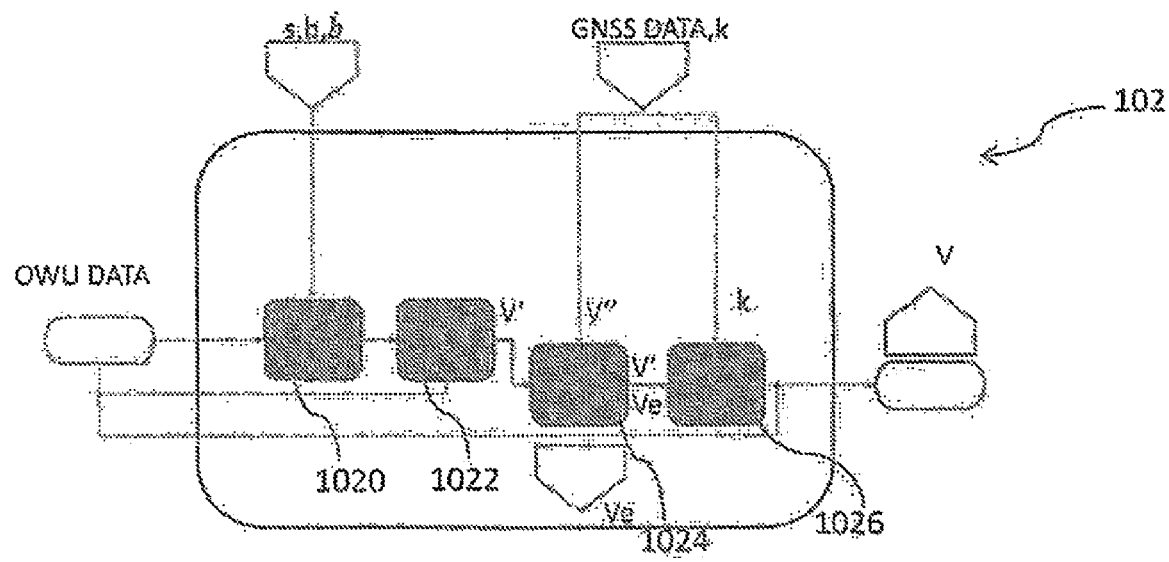
FIGS. 6 and 7 are exemplary of possible implementations of a velocity calculation block, according to one or more embodiments.
Figure 7:
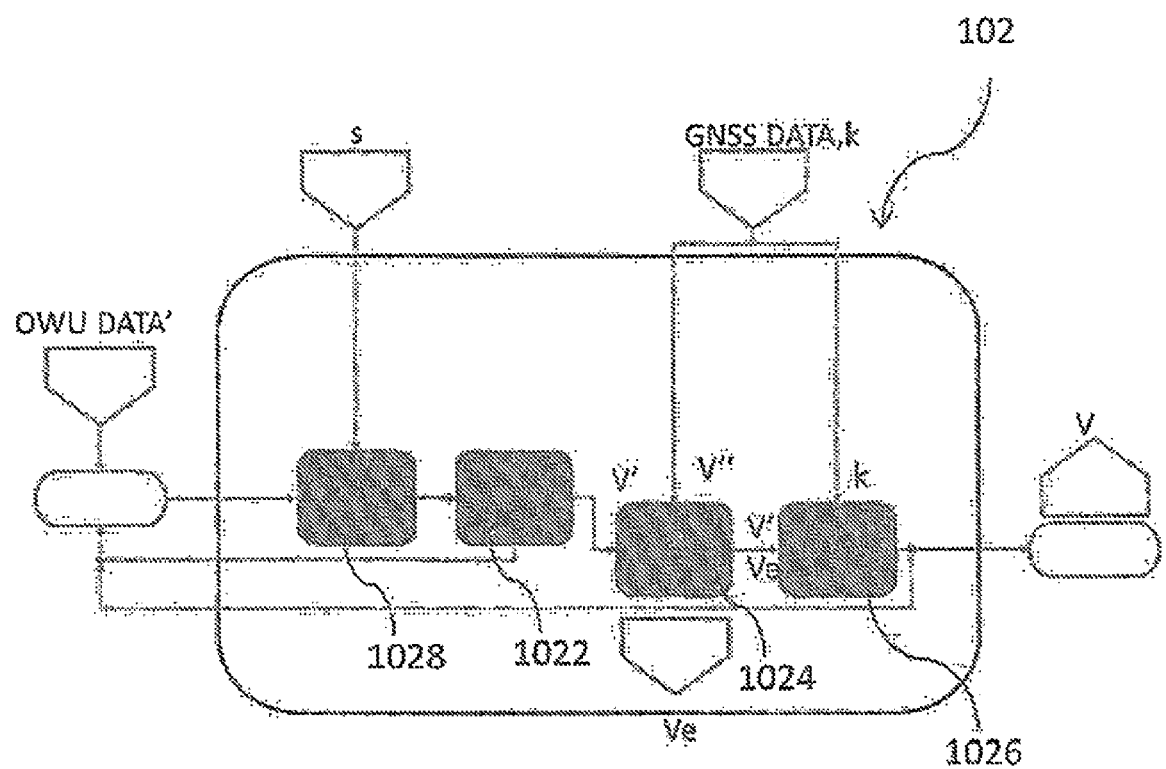

The sensors that may be placed on the on-wheel unit OWU may start operation when the vehicle starts moving, i.e., the wheels begin to rotate, the sensors being used to (start) assessing rates and accelerations correlated with the rotation rate. As exemplified in FIGS. 1 and 2, the sensors providing information on the wheel may be based on the gyroscope 10 or the accelerometer 16, or in one or more embodiments a fusion of the two sensors may be exploited. In FIGS. 6 and 7 two different embodiments of the velocity calculation block 102 are detailed, operating on OWU DATA obtained by the gyroscope 10 and the accelerometer 16, respectively. The sensor(s) data may be used to calculate the vehicle velocity V: in case of the gyroscope 10, in FIG. 6, this may be done directly on the sensor signal, in case of the accelerometer 16, the sensor signal may be processed in order to obtain a signal representative of the rotation rate, on which is then calculated the velocity. The sensor (10 and/or 16) signal(s) are preferably also calibrated, e.g., before performing the velocity calculation. Still with reference to operation of the system, in one or more embodiments, the on-board gyroscope 24 signal may be used (possibly at the same time) to derive vehicle heading H'. A combination of the (corrected, i.e., calculated from the sensor and GNSS values) velocity V and heading H output from the corresponding blocks 102 and 106, derived from the sensors, may be then used in the navigation block 108 to calculate a user position P'.

As was previously mentioned, GNSS DATA may be used as an absolute reference for velocity V", heading H" and position P", correcting possible errors that may be induced by sensor drifts or miscalibration. In one or more embodiments, such errors, in particular a position error Pe and a velocity error Ve, may be fed back to the calibration blocks 100a, 100b, 100c, as shown in FIG. 4 and FIG. 5 and may be used to improve sensor calibration.

In FIGS. 6 and 7 are detailed two different embodiments of the velocity calculation block 102, operating on OWU DATA obtained by the gyroscope 10 and the accelerometer 16, respectively.

Generally, the velocity calculation block 102 may receive as an input the parameters s, b, b̂ from the calibration blocks 100a and/or 100c, GNSS data and quality indicator k, and on-wheel unit sensor data, OWU DATA, e.g., processed data OWU DATA' (indicative of the wheel rate) in case of an implementation using the accelerometer 16, and provide as an output the corrected velocity V plus possibly a velocity error Ve that may be used as feedback for calibration.

In the disclosure, reference to a corrected velocity V, heading H or position P is made to differentiate such values from the correspondent calculated sensor-based values V'/H'/P'. In fact, the corrected velocity V, heading H and position P are also estimated by comparing the calculated (sensor-based) values V'/H'/P' with GNSS-based values V"/H"/P".

The velocity calculation block 102 may be configured to receive from the on-wheel sensor(s) a wheel rate signal and calibrate it to obtain a velocity estimate V'. It may be implemented differently according to the on-wheel sensor(s), gyroscope 10 and/or accelerometer 16.

In particular, in FIG. 6 with 1020 is indicated a calibration block receiving the data from the OWU unit, OWU DATA.

When the OWU DATA is received, the signal may be calibrated (in a block 1020) using the parameters s, b estimated by the gyroscope 10 calibration block bow and received as input, as per equation (1), the calibration block bow possibly operating in parallel with respect to the velocity calculation block 102. The resulting OWU DATA, outputted by block 1020, expressed in meters per second, may be averaged (integrated) in a block 1022 for e.g., 1 second in order to reduce noise, and in order to set the bandwidth in line with the conventional bandwidth of a GNSS receiver 26 (e.g., 1 Hz). Such calibrated and averaged on-wheel gyroscope 10 signal, OWU DATA, defines a sensor-based velocity estimate V'.

The sensor-based velocity estimate V is then compared (in a block 1024) to a velocity reference V", included in GNSS data; the difference, i.e., velocity error, Ve may be used to correct (e.g., in 1026) the sensor velocity estimate V and/or as a feedback to the calibration blocks 100a, 100b, 100c.

In one or more embodiments, velocity updates (and other described techniques) may be based on exploiting the difference between sensor-based estimates of the outputs (e.g., velocity V', position P', and heading H') and a direct observation of the heading made through GNSS (P", V", H"). Such a difference may be defined as error, i.e., it may represent the results of an error in the estimation of one or more of the variables of the system according to one or more embodiments.

However, the correction may be possible only if the selected reference can be considered accurate. If the reference is not accurate, the error cannot be considered only due to calibration and—if it is used for correcting the e.g., parameters—the error may lead to an inaccurate estimation and possibly faults in the feedback loop.

Identifying situations in which the GNSS reference may be considered corrupted, and therefore not usable, may be relevant in certain situations.

In one or more embodiments, if the GNSS signal is of poor quality or absent, the quality indicator (e.g., k) may nullify its contribution, and therefore use a corrected velocity estimate V (in block 1026) which is purely sensor derived. If, however, the GNSS signal may be considered as valid, its contribution (e.g., the reference V") may be relevant in estimating the corrected velocity V in block 1026.

In one or more embodiments, the error, depicted in FIGS. 6 and 7 with reference Ve, may be used as feedback to calibration blocks 100a, 100b, 100c.

The velocity calculation block 102 depicted in FIG. 7 is exemplary of a somewhat similar block with respect to FIG. 6, with the same references between the two Figures being representative of similar sub-blocks.

In one or more embodiments, as depicted in FIG. 7, instead of using (raw) sensor samples, the on-wheel accelerometer 20 samples may be transformed into wheel rate, transmitted, scaled to m/s via the calibration parameters (block 1028), and then transmitted to a fusion stage with the estimated GNSS velocity V", if valid.

The calibration parameters may include in one or more embodiments only the scale received as input, insofar as the wheel rate derived may not be affected by any bias.

It will be noticed that, in one or more embodiments, both the sensors 10 and 16 may be present, and therefore both the sub-blocks of the respective processing chains. In one or more embodiments, the corrected output velocity V may be selected from one of the two calculated sensors velocities V', or it may be a combination of the two. This solution may make it possible to facilitate overcoming the limitations of a single sensor.

As already stated, the velocity calculation block 102 may calculate the corrected velocity V of the vehicle, using the on-wheel sensor data—either of the accelerometer 16, the gyroscope 10, or both—calculated velocity V', which may be referenced and corrected with GNSS absolute velocity reference V", if one is available.

Figure 8:
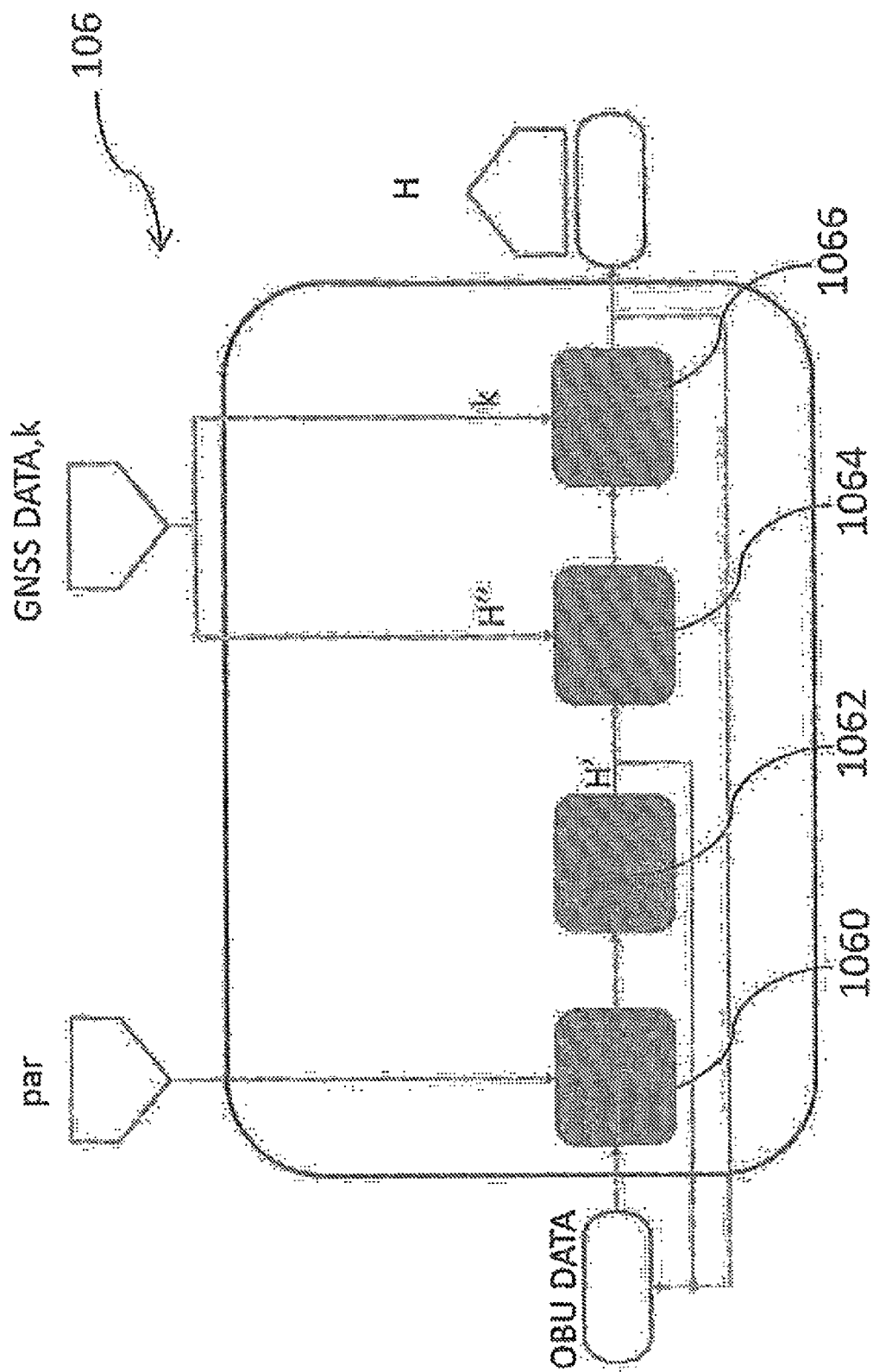
FIG. 8 is exemplary of a possible implementation of a heading calculation block, according to one or more embodiments.

In one or more embodiments, the heading calculation block 106, represented in FIG. 8, may be performing a similar operation flow with respect to the velocity calculation block 102. The heading calculation block 106 calculates the (corrected) vehicle heading H using the on-board gyroscope 24, using a calculated heading H' (in block 1062) being referenced and corrected (in a block 1064) by a GNSS absolute heading reference H" received as input, if available.

The block 106 may be used to describe how the heading of the vehicle changes over time during operation.

As previously explained, the samples that may be used for calculation are those sensed by the gyroscope 24 axis which may be perpendicular to the vehicle travel direction. For example, in one or more embodiments, the on-board gyroscope 24 may be a single axis gyroscope placed accordingly. If a non-perpendicular installation is desired, a 3-axes gyroscope 24 may be considered and its axes resolved, using techniques which are known in the art, in order to extract a perpendicular-like signal.

In one or more embodiments, the raw samples may be subjected to one or more of the following steps, in particular in block 106:

receiving as input the current calibration parameters par (estimated by the on-board gyroscope calibration block mob discussed previously), compensating (block 1060) the OBU DATA received for bias and scale, converting from digital to physical units (e.g., degrees or radians per second), integrating (block 1062) for, e.g., 1 s, with the signal, being an angular rate, representing the heading angle (in degrees or radians, depending on calibration) after integration, and comparing block (1064) the "sensor-wise" version of the heading H' with a reference, since the sensor-wise version may be subjected to drift caused by error(s) either on a calibration parameter and/or on the signal itself.

In one or more embodiments, such reference heading may be provided by the GNSS signal H," received as input, if available.

In one or more embodiments, the accuracy estimation may be provided by the GNSS quality metrics, e.g., quality indicator k which may be received as an input and used to decide if the GNSS signal may be exploited for correction and to what extent (due to, e.g., a GNSS signal that may be considered corrupted or partially corrupted).

In one or more embodiments, a correction block 1066 may be provided to correct the sensor heading estimate H', similarly to the correction operation previously described, by multiplying it by an error, scaled by the quality indicator k, where k, as previously indicated, may be 0 in case quality metrics is found to be under a certain threshold, 1, if above a possibly further upper threshold, and possibly changing smoothly from 0 to 1, proportionally to the quality estimation.

In one or more embodiments, the corrected velocity V and heading H calculated in blocks 102 and 106 may be used to compute the user position P', P. In fact, navigation is the action of detecting a user position in a given reference frame. According to one or more embodiments, the chosen reference frame may be a local geodetic one, i.e., latitude and longitude, e.g., according World Geodetic System (WGS), revision $8_4$ (WGS$8_4$) ellipsoid.

Figure 9:
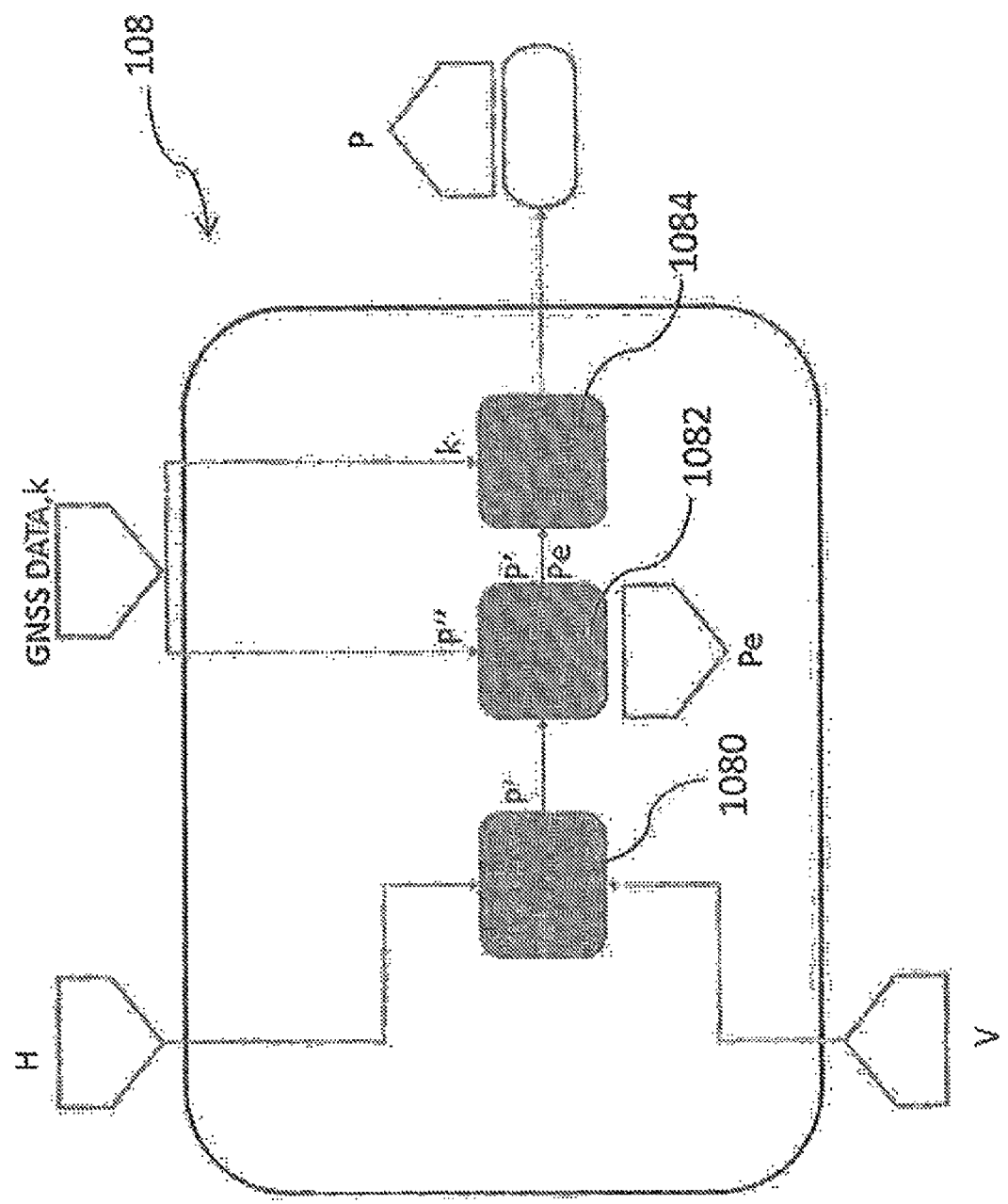
FIG. 9 is exemplary of a possible implementation of a navigation block, according to one or more embodiments.

Following the steps depicted in FIG. 9, the system according to one or more embodiments may be able to exploit the sensors to update position P adding deltas, i.e., adding motion to a starting point.

It will be noticed that a starting point may be required at start-up and/or after reset and/or after a fault occurs.

The navigation block 108 of FIG. 9 may receive as an input the (calculated) corrected heading H from the heading calculation block 106 and the (calculated) corrected velocity V from the velocity calculation block 102, and may transmit as an output (from block 1084) the corrected position P of the vehicle. In one or more embodiments, a position error Pe (calculated in a correction block 1082) may be sent as a feedback to the system, e.g., to calibration blocks 100*a*, 100*b*, 100*c* (and/or to block 1084 as further described in the following), and/or the block 108 may also transmit the velocity, time and heading calculation to a user (not illustrated in FIG. 9).

In one or more embodiments, the navigation block 108 may be configured to perform the steps of:

receiving current corrected heading H and current corrected velocity V; and/or updating (1080) the position P' based on the current corrected heading H and velocity V; and/or receiving the current position P''' obtained from the GNSS receiver 26; and/or calculating (1082) the position error Pe, based on the difference between the calculated position P' and the GNSS position P'''; and/or receiving the GNSS quality indicator, e.g., k; and/or correcting (1084) the position P based on the calculated position P', the position error Pe and the quality indicator k.

In one or more embodiments, the position may be initialized using the GNSS position P'''. After the first, the time, heading and velocity may be updated by on-wheel unit OWU sensor(s) at each iteration, the corrected heading H and velocity V being used to calculate an estimated position P', according to equations 13 and 14.

$$\lambda_t = \lambda_{t-1} + \cos(h_t)s_t dt \quad (13)$$

$$\phi_t = \phi_{t-1} + \sin(h_t)s_t dt \quad (14)$$

In one or more embodiments, the equations describe a sensor-based version of position calculation. That, with fusion techniques similar to those described for velocity and heading may be compared with a reference provided by GNSS.

In one or more embodiments, the error Pe, modulated by a weighting factor given by the GNSS error metric. For example, the quality indicator k may be used to improve position estimate and/or as a feedback (if the GNSS signal is deemed as valid) to the calibration stages 100*a*, 100*b*, 100*c* in order to improve the calibration of sensor(s) parameters. This may be done under the assumption that, in good GNSS condition, an error in predicted position P' is given by either an error in velocity V and/or in heading H, hence either on the on-wheel unit OWU and/or on-board unit OBU sensors calibration.

In one or more embodiments, GNSS may assess the car velocity V''' as well as its position P'''.

In one or more embodiments, an on-wheel unit OWU may feature a 3-axes gyroscope device mounted on a wheel with x and y axes parallel to the wheel surface, and z axis perpendicular to the wheel surface, i.e., parallel to the vehicle front axle. In one or more embodiments, the gyroscope may be placed on the rear wheels, to facilitate reducing the influence of steering during turns.

The resulting data, namely the data obtained through GNSS and the gyroscope 10, may exhibit a similar shape, i.e., the data may be proportional to one another.

In fact, the model may exhibit small errors, e.g., the peak error may be of 2.5 km/h. It will be noticed that the peak errors, which are nonetheless small, may occur at accelerations/decelerations, i.e., the peak errors may not be errors, e.g., in sensors data, but lags/delays on, e.g., GNSS velocity measurement. Such errors may be considered as a compromise among the Doppler frequency tracking in GNSS receivers.

It may be considered, on the other hand, the average error in absolute value, i.e., the Root Mean Square (RMS), e.g., 0.42 km/h, which is a value comparable in accuracy to the granularity of, e.g., conventional velocity/travelled path sensors available on CAN bus from vehicle manufacturers.

In one or more embodiments, LS (Least Squares) calculation method may be suitable for post processing of the results, insofar as it may rely on a considerable portion of the data history to be applied. However, being base on facilitating reducing the quadratic error, it may be used to implement a preferably real time procedure for calibration parameters estimation. A calibration block may be exemplified in FIG. 10, e.g., the on-wheel unit gyroscope calibration block bow is exemplified.

In one or more embodiments, the calibration block bow may include one or more of the following steps:

receive as an input a sample from the gyroscope 10, e.g., OWU DATA, quality indicator k and errors on velocity Ve and position Pe; and/or assess (block 1000) if the vehicle is stationary, i.e., if the vehicle has stopped, based on the gyroscope 10 signal, e.g., using a threshold on assessed rate (even in slow motion the assessed rate may reach relevant values, e.g., at 16 km/h it is already about 500 dps); and/or if the vehicle is stationary (verified in block 1000, positive answer Y), calculate (block 1002) the bias error (if the vehicle is stationary, the observed data received may represent substantially the bias); and/or update (block 1004) the on-wheel unit OWU bias b estimate, e.g., updating the value directly or comparing the observed data OWU DATA with the current estimate and updating while scaling based on the calculated error, such as in a feedback loop;

update (block 1006) the on-wheel unit OWU bias derivative b estimate, based on the value of the bias b;

if vehicle is moving (verified in block 1000, negative answer N), the estimation of the scale factor may be triggered, and the first step may be accumulating and averaging (block 1008) the data, e.g., for 1 s (a portion of the received data may be discarded in order to filter out noise); and/or compensate (block 1010) with the current estimate of the bias b; and/or correct miscalibration (block 1012) based on the received errors Ve, Pe, and the quality indicator k, obtaining a correct scale s.

The correction block may be fed, other than from the velocity error Ve also from the position error Pe, insofar as the sensor based (and calibration dependent) velocity estimate, if integrated over time from a certain starting point, may allow to calculate a sensor-based position estimate that—in case calibration errors are present—may be different from a reference, e.g., obtained through GNSS.

In one or more embodiments, the error resulting from the comparison of the calculated position with the GNSS position may be fed back to the on-wheel unit OWU calibration block bow, to further refine the scale factor estimation.

The GNSS quality block may provide an input to the scale estimation. The calibration, and one or more of the other update techniques related to the system according to one or more embodiments, may be based on the difference between sensor-based estimates of the outputs (e.g., velocity, position, and heading) and a direct observation of the position, velocity and heading obtained through GNSS. Such a difference may be defined as error, and the difference may represent an error in the estimation of one or more of the variables of the system.

However, in presence of an inaccurate reference, the resulting error may not be considered being related completely to calibration and—if used in the correction—may lead to an inaccurate estimation and possibly a fault in the feedback loop.

For the previous reasons, the GNSS quality evaluation block no may be present, to identify situations in which the GNSS reference is corrupted and not usable.

Figure 10:
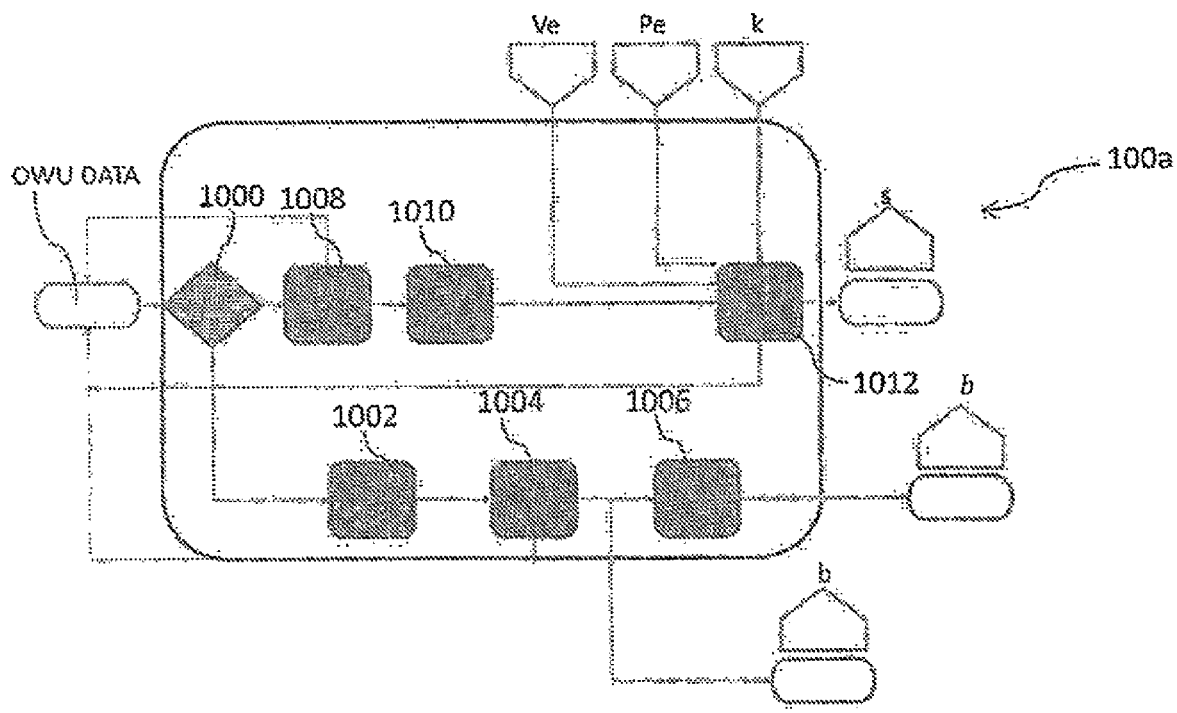
FIGS. 10 and 11 are exemplary of possible implementations of calibration blocks, according to one or more embodiments.
Figure 11:
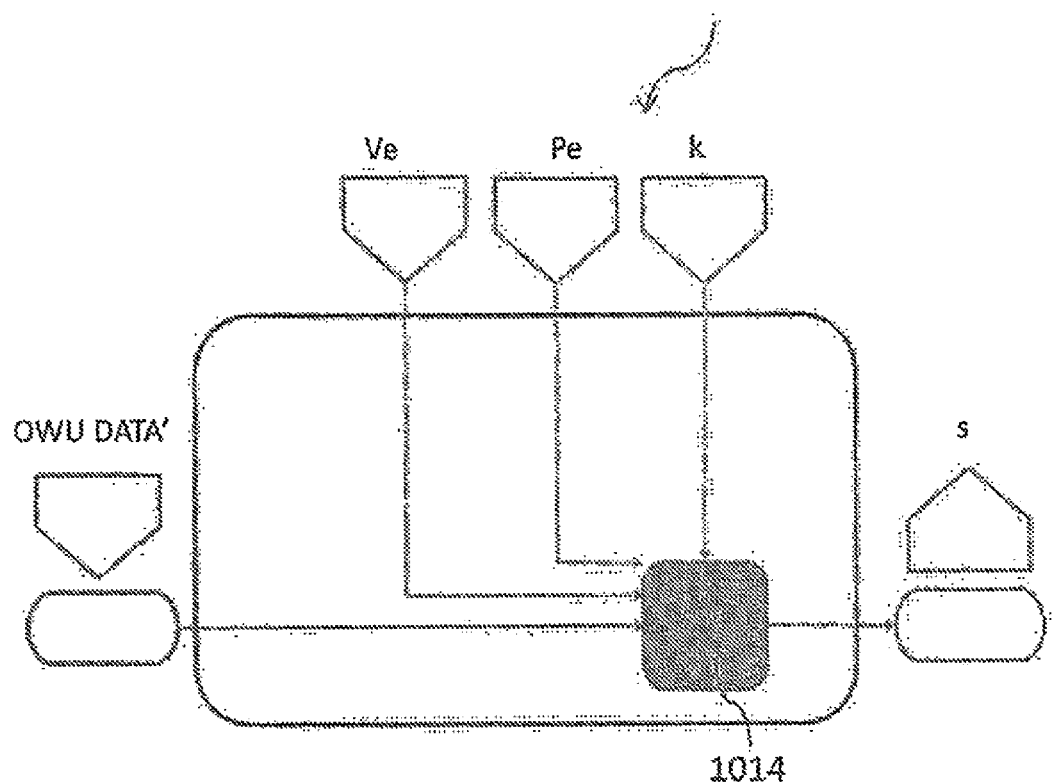

In one or more embodiments, as exemplified by FIG. 11, an accelerometer 16 may be present on the on-wheel unit, which may or may not also incorporate a gyroscope 10, e.g., when employing a MEMS 6-axis IMU, i.e., a unique sensor case embedding both gyroscope and accelerometer. The same reference numbers that are found both in FIGS. 10 and 11 describe similar blocks and a more detailed description thereof is therefore superfluous.

In one or more embodiments, as described in FIG. 11, processed data OWU DATA' (which may be sinusoidal) may include data relative to the rotation of the wheels.

The data OWU DATA' may include two accelerations:

a linear motion acceleration, resulting from the vehicle, e.g., accelerating along its trajectory; a low frequency, relatively low modulus component, and a gravity acceleration, the projection on the axis may be correlated with the current angle of the wheel in respect of its initial starting position.

The gravity vector has modulus 9.81 m/s^2 (1 g), pointing normal to the center of the earth and, when the accelerometer sensing axis is aligned with such direction and pointing forward, it may be able to facilitate sensing; however when the axis, due to wheel rotation, changes of 180°, it may have in the same direction of the gravity vector but opposite verse, hence it may exhibit a reduction in sensing. Therefore, the intermediate axis positions may provide a variation of the signal between peaks that may be considered sinusoidal, derived by the rotation of the wheel which is substantially a circle. Moreover, the period of the sinusoidal may be equal to one wheel revolution. The on-wheel unit OWU accelerometer 16 signal may be therefore a sinusoidal signal having a variable frequency, the frequency being directly proportional (with a scale factor) to the vehicle velocity.

Consequently, processing the signal may be equal to decoding a frequency modulated wave, using, e.g., a quadrature component that the on-wheel unit accelerometer 16 may provide. In fact, exploiting a different axis of the accelerometer 16, e.g., y with respect to a first axis x, which is 90° with respect to x, it may be possible to verify that the axes may be able to provide a signal substantially identical to x (the negligible motion component and the slope may be ignored) only shifted of 90 degrees in phase.

Figure 12:
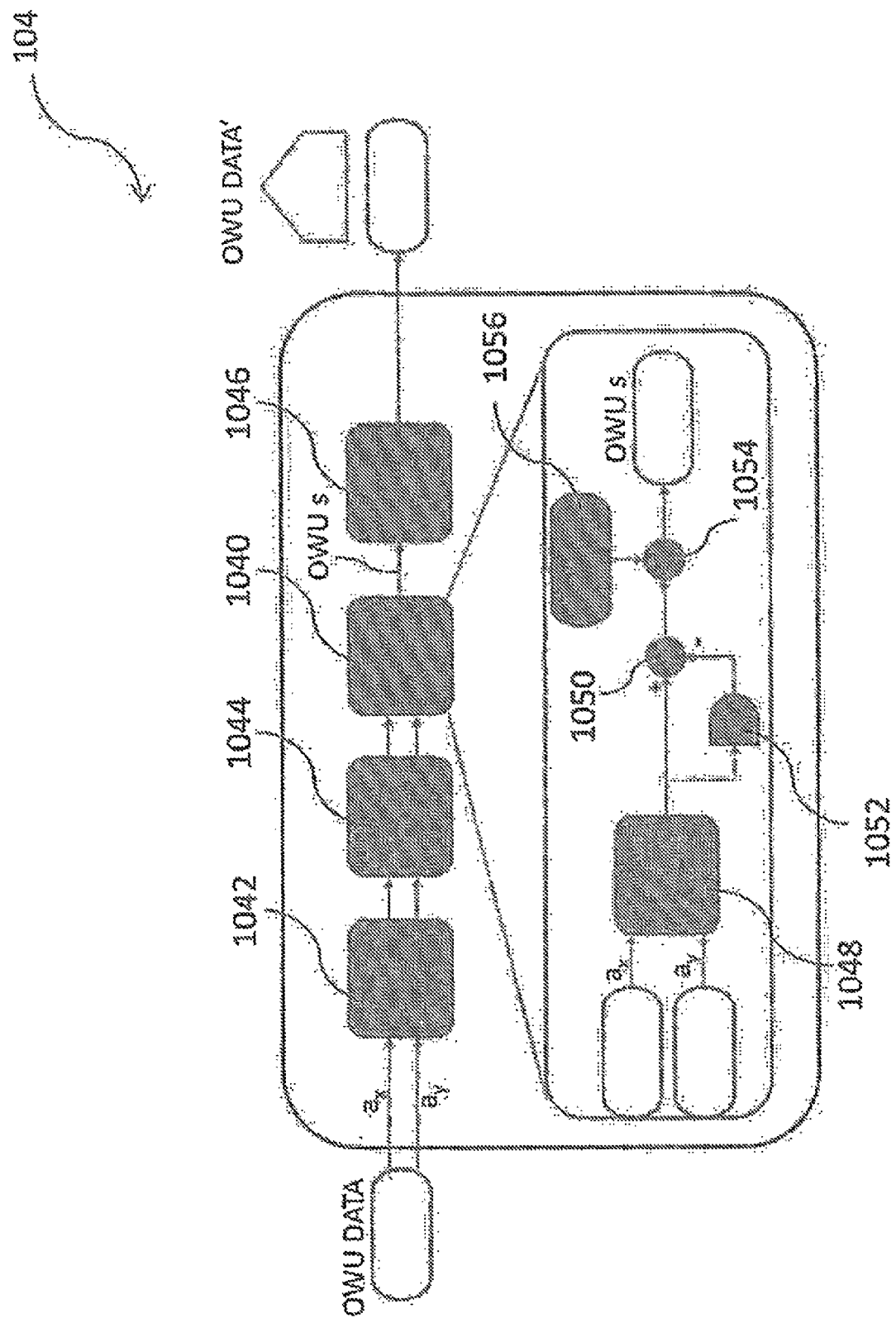
FIG. 12 is exemplary of a possible implementation of a wheel rate calculation block, according to one or more embodiments.

In one or more embodiments, to transform raw OWU DATA of the accelerometer 16 into a wheel rate signal, a transformation block 104 may be needed, exemplified in FIG. 12, which may include an FM demodulator 1040, detecting phase and differentiating it to obtain frequency.

In one or more embodiments, the wheel rate calculation block 104 may also include one or more of:

a low pass filter (block 1042), a normalization (block 1044), a moving average filter (block 1046), used to smooth the rate signal.

In FIG. 12, the references ax and ay represent the acceleration in the x and y axis direction respectively.

In one or more embodiments, the FM demodulator 1040 may include calculating (block 1048) the arctangent of the accelerations, subtracting (block 1050) it with respect to a delayed version of the arctangent (z-1 discrete time operator in block 1052) and multiplying (block 1054) the result with a factor (block 1056), e.g., ½π Ts, Ts being the period of the accelerometer signals. In one or more embodiments, once the raw acceleration signal has been demodulated to a rotation rate signal, the correct scale may be calculated. In fact, the output of the FM demodulator 1040 may include a normalized, unit-less signal OWU s, however a velocity in meters per second may be used for further processing.

The logic flow to compute such scale factor (1014 of FIG. 11) may retain certain similarities with respect to the calibration of the gyroscope bow shown in FIG. 10: in one or more embodiments, the rotation rate—which may be directly proportional to velocity—may be compared with respect to the GNSS estimation of the velocity, received as an input. The generated error may be fed back to correct the scale factor (block 1014).

As mentioned previously, for a correct evaluation GNSS signal may be used only if considered valid, i.e., of good quality, which may be learned through the quality indicator k received as input, evaluated by the GNSS quality evaluation block. In one or more embodiments, the metrics evaluated may permit no parameters update or partial update, e.g., proportional to quality. Again, not only the error in velocity, but also the error of the integrated position, received as input, may be used as a feedback for correction.

It will be noticed that, in a system according to one or more embodiments, a permanent bias may be avoided; however, one or more spikes may occur, especially during velocity decrease. The spikes may be related to the fact that during deceleration the tracking loops of a GNSS receiver may experience some lag. Such lags however may not provide a decrease in performance for one or more embodiments.

It will be also noticed that the occurring spikes may be positive and negative, in the same number, e.g., a large positive spike is followed by a negative spike. Therefore, in view of the integration undergone by velocity to obtain the position, the error may be further reduced, insofar as the positive and negative spikes may compensate each other.

In one or more embodiments, the estimated scale factor may be of about 213 mm per degree, i.e., every degree of rotation assessed by a sensor may imply an increase of 2 cm of travelled path.

In one or more embodiments, another metric may include the RMS error, quadratic error, for the on-wheel unit OWU velocity, i.e., 0.61 km/h. Such a unit may therefore be competitive with respect to conventional automotive odometer sensors (e.g., ABS), the OWU implementation as velocity sensor for the WDR system may be considered.

In one or more embodiments, the turn rate of wheel rotation may be relevant, therefore all the signals from the gyroscope axes may be used, even the signal from the axis parallel to wheel rotation, which in an ideal scenario would not sense anything. In reality, the axis parallel to the wheel rotation senses the rate, and the signal may be non-negligible so that it may be exploited in a WDR system.

In one or more embodiments, exploiting sensor imperfections may be possible, such as cross axis effects, internal small misalignment or the misalignment itself due to manual installation, in order to calculate the error; however, the axis may be less sensitive, which may result in a higher scale factor (e.g., 50 cm)—resulting in less resolution—and a larger error, with local peaks up to 10 m/s and a quadratic error RMS of 2 m/s.

In one or more embodiments, the calibration and velocity computations described previously may be iterated in, e.g., 3 parallel series, one per each gyroscope axis xyz.

Such a redundancy may provide with the possibility, in one or more embodiments, to detect fault(s) in the measurements more easily, e.g., allowing to choose a most performing axis and/or to obtain a performing a fusion of each axis measurement.

In one or more embodiments, the on-wheel unit gyroscope 10 z axis may be used, being the most sensitive.

Using the less sensitive axis, i.e., y, may provide a good quality of position performance of the WDR, with the exception of one or more corners and turns, where the velocity may be overestimated (i.e., the vector modulus may be larger than average). This effect may be caused by the fact that, during turns, the axes parallel to the wheel surface may sense the vehicle turn rate while the z axis may be considered almost insensitive to it.

This effect may cause in the x and y axes of the gyroscope 10 signals spurious components that are known in the art as coning effects.

One or more embodiments may involve the use of a system having a non-connected DR implementation ("wireless").

Whereas a conventional DR system may be composed of a single unit containing all the system components, and to which all external outputs (e.g., distance sensor and/or GNSS antenna) may be connected, a WDR system according to one or more embodiments may be composed of two units which may be independent, not requiring thus a vehicle connection.

An advantage of one or more embodiments is that the system previously described may provide the same high accuracy level of conventional DR systems without connecting with the vehicle. In other words, it may provide the same user-friendliness and ease of installation of a pure INS inertial system with DR accuracy, facilitating overcoming the limitations of both technologies.

Different implementations may be considered for one or more embodiments, e.g., it may include a GNSS receiver, 2 motion sensors (2 gyroscopes or a gyroscope plus an accelerometer), 1 BT transmitter Tx and 1 BT receiver Rx.

Without prejudice to the underlying principles, the details and embodiments may vary, even significantly, with respect to what has been disclosed by way of example only, without departing from the extent of protection.

The extent of protection is defined by the annexed claims.

What is claimed is:
1. A system for land vehicle navigation comprising:
a Global Navigation Satellite System (GNSS) receiver configured to provide GNSS data;
a set of sensors positioned on a wheel of a vehicle and on board the vehicle, wherein the set of sensors is configured to generate sensor data that can be processed to obtain a distance travelled by the vehicle and an attitude of vehicle;
a processor configured to perform a fusion of the sensor data from the set of sensors and the GNSS data, the processor including a velocity calculation block having a first feedback path and a navigation engine block having a second feedback path;
an on-wheel unit located on the wheel of the vehicle, the on-wheel unit comprising a first wireless communication module, and a first subset of sensors of the set of sensors, the first subset of sensors configured to generate first sensor data that can be processed to obtain the distance travelled by the vehicle;
an on-board unit comprising the GNSS receiver, a second wireless communication module, and a second subset of sensors of the set of sensors, the second subset of sensors configured to generate second sensor data that can be processed to obtain the attitude of vehicle, wherein the first and second wireless communication modules are configured to establish a wireless link to exchange over the wireless link the first sensor data, the on-board unit being configured to operate in association with the processor to process the first and second sensor data to obtain the distance and the attitude of the vehicle and to perform the fusion with the GNSS data; and a plurality of calibration blocks coupled to at least one of the on-wheel unit and/or on-board unit and coupled to at least one of the first or second feedback paths,
wherein the processor is further configured to:
assess if the vehicle is stationary based on the first subset of sensors,
when the vehicle is stationary, determine a bias error based on the first subset of sensors and update a bias estimate based on the bias error, and
when the vehicle is moving, determine a velocity of the vehicle based on the updated bias estimate.

2. The system of claim 1, wherein the wireless link implements Bluetooth, Wi-Fi, or a dedicated short range wireless communication protocol.

3. The system of claim 1, wherein the GNSS data comprises position, velocity, heading and time values.

4. The system of claim 3, wherein the processor comprises a GNSS quality evaluation module configured to calculate a quality indicator, wherein the quality indicator is indicative of a quality of GNSS position, heading, velocity and time values, and wherein the processor is configured to compute corrected position, velocity, heading and time values based on the quality indicator.

5. The system of claim 1, wherein the processor is configured to compute corrected values for position, velocity, heading and time values of the vehicle by weighting a contribution of the GNSS data based on a quality indicator indicative of a quality of GNSS data.

6. The system of claim 1, wherein the set of sensors comprises a gyroscope positioned on board the vehicle.

7. The system of claim 1, wherein the set of sensors comprises an accelerometer positioned on the wheel of the vehicle.

8. The system of claim 7, wherein the accelerometer is a 3-axes accelerometer.

9. The system of claim 1, wherein the first sensor data comprises an angular rate of the wheel.

10. The system of claim 1, wherein the on-board unit further comprises the processor.

11. The system of claim 1, wherein the second wireless communication module is configured to exchange information with the processor in digital form via a wired communication link.

12. The system of claim 11, wherein the wired communication link implements Inter-Integrated Circuit ($I^2C$) or Serial Peripheral Interface (SPI) protocol.

13. The system of claim 1, wherein the set of sensors comprises a gyroscope positioned on the wheel of the vehicle.

14. The system of claim 1, wherein the on-wheel unit comprises an energy harvester.

15. The system of claim 1, further comprising a storage unit configured to store data and use it for land vehicle navigation analysis.

16. The system of claim 1, wherein the processor is further configured to, when the vehicle is moving,
estimate a scale factor based on the first subset of sensors, and
correct the scale factor based on the updated bias estimate, wherein determining the velocity of the vehicle is further based on the corrected scale factor.

17. A method for land vehicle navigation, the method comprising:
receiving sensor data from a plurality of inertial sensors, wherein a first subset of sensors of the plurality of inertial sensors is located on a wheel of a vehicle, and a second subset of sensors of the plurality of inertial sensors is located on board of the vehicle, and wherein the plurality of inertial sensors are external to the vehicle;
receiving Global Navigation Satellite System (GNSS) position, velocity, heading and time values from a GNSS receiver;
calibrating the sensor data with calibration parameters;
calculating inertial position, heading, velocity and time values based on the sensor data, without using GNSS position, velocity, heading and time values;
calculating a quality indicator, indicative of a quality of the GNSS position, heading, velocity and time values, based on a GNSS signal power of a GNSS signal received by the GNSS receiver;
computing respective error values as differences between inertial and GNSS position velocity, and heading values in a velocity calculation block and a navigation engine block of a processor;
updating the calibration parameters as a function of the calibration parameters and the respective error values via a feedback path from at least one of the velocity calculation block and the navigation engine block of the processor;
calculating a corrected position, heading, velocity and time values as a function of the respective error values by weighting a contribution of the GNSS position, heading, velocity and time values based on the quality indicator when the GNSS signal power is above a power threshold, wherein the quality indicator comprises a value between 0 and 1 based on the GNSS signal power; and
transmitting the corrected position, heading, velocity and time values.

18. The method of claim 17, wherein receiving sensor data comprises receiving sensor data via a wireless link.

19. The method of claim 17, wherein the power threshold is about 20 dB/Hz, and wherein the quality indicator has a value of 1 when the GNSS signal power is above 45 dB/Hz.

20. A vehicle comprising:
a wheel comprising an on-wheel unit, the on-wheel unit comprising a first wireless module and a first inertial sensor, the first inertial sensor configured to generate first inertial data; and
an on-board unit comprising:
a Global Navigation Satellite System (GNSS) receiver configured to receive a GNSS signal having a GNSS signal power and configured to provide GNSS data based on the GNSS signal,
a second inertial sensor configured to generate second inertial data,
a second wireless module configured to establish a wireless link with the first wireless module, and
a processor configured to:
calculate inertial position, heading, velocity and time values of the vehicle based on the first and second inertial data,
calculate a GNSS quality indicator indicative of a quality of GNSS data based on the GNSS signal power,
compute corrected position, velocity, heading and time values of the vehicle by weighting a contribution of the GNSS data based on the GNSS quality indicator when the GNSS signal power is above a power threshold, wherein the GNSS quality indicator comprises a value between 0 and 1 based on the GNSS signal power, and generate position and velocity error signals for calibration blocks associated with the on-wheel unit and/or on-board unit via one or more feedback paths.

21. The vehicle of claim 20, wherein the processor is configured to:
low-pass filter the first inertial data to produce a filtered inertial data;
perform FM demodulation on the filtered inertial data to produce a processed rate indicative of a wheel rate; and
compute the corrected velocity based on the processed rate.

* * * * *